(12) United States Patent
Yamagishi et al.

(10) Patent No.: US 9,921,535 B2
(45) Date of Patent: Mar. 20, 2018

(54) MOTOR DRIVING DEVICE, SHEET CONVEYING DEVICE, AND IMAGE FORMING APPARATUS

(71) Applicant: KYOCERA Document Solutions Inc., Osaka-shi, Osaka (JP)

(72) Inventors: Yuki Yamagishi, Osaka (JP); Kenichi Onishi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 57 days.

(21) Appl. No.: 15/126,257

(22) PCT Filed: Jan. 29, 2016

(86) PCT No.: PCT/JP2016/052640
§ 371 (c)(1),
(2) Date: Sep. 14, 2016

(87) PCT Pub. No.: WO2016/132862
PCT Pub. Date: Aug. 25, 2016

(65) Prior Publication Data
US 2017/0082965 A1   Mar. 23, 2017

(30) Foreign Application Priority Data

Feb. 17, 2015   (JP) .................................. 2015-028827
Feb. 17, 2015   (JP) .................................. 2015-028828
Feb. 17, 2015   (JP) .................................. 2015-028829

(51) Int. Cl.
*B65H 5/06* (2006.01)
*H02P 6/17* (2016.01)
(Continued)

(52) U.S. Cl.
CPC .......... *G03G 15/6529* (2013.01); *B65H 5/06* (2013.01); *B65H 5/062* (2013.01); *B65H 7/00* (2013.01);
(Continued)

(58) Field of Classification Search
CPC ............ B65H 2557/33; B65H 2513/10; B65H 2513/22; B65H 2513/512; B65H 2553/51; B65H 7/00; B65H 7/20; H02P 6/17
See application file for complete search history.

(56) References Cited

U.S. PATENT DOCUMENTS 5,260,811 A    11/1993   Morikawa
8,090,469 B2 *  1/2012   Sutoh ..................... B41J 11/425
                                                    700/213
(Continued)

FOREIGN PATENT DOCUMENTS

JP   2002137479 A   5/2002
JP   2004312336 A   11/2004
(Continued)

OTHER PUBLICATIONS

European Patent Office, Extended European Search Report Issued in European Application No. 16752251.5, dated Aug. 8, 2017, Germany, 7 pages.

*Primary Examiner* — Luis A Gonzalez
(74) *Attorney, Agent, or Firm* — Alleman Hall Creasman & Tuttle LLP

(57) ABSTRACT

A speed control portion of a motor driving device performs a deceleration control of decelerating a rotation speed of a driving motor based on a first pulse signal for the deceleration control that includes a plurality of pulses whose pulse width corresponds to each commanded speed to the driving motor. A pulse signal output portion generates the first pulse signal and a second pulse signal and outputs the second pulse signal to the speed control portion after outputting the (Continued)

first pulse signal to the speed control portion, wherein the pulse width of the first pulse signal changes by obeying a predetermined rule that corresponds to a deceleration tendency of the rotation speed during the deceleration control, and the second pulse signal does not obey the predetermined rule. When a determination processing portion determines that the second pulse signal is included in an input signal, the deceleration control is ended.

14 Claims, 12 Drawing Sheets

(51) Int. Cl.
*G03G 15/00* (2006.01)
*H02P 29/00* (2016.01)
*B65H 7/00* (2006.01)
*G05B 19/416* (2006.01)
*H02P 27/08* (2006.01)

(52) U.S. Cl.
CPC ......... *G03G 15/50* (2013.01); *G03G 15/5008* (2013.01); *G03G 15/6532* (2013.01); *G03G 15/6564* (2013.01); *G05B 19/416* (2013.01); *H02P 6/17* (2016.02); *H02P 27/08* (2013.01); *H02P 29/00* (2013.01); *B65H 2513/10* (2013.01); *B65H 2513/512* (2013.01); *B65H 2557/33* (2013.01); *B65H 2801/06* (2013.01); *G03G 2215/00945* (2013.01); *Y02P 70/30* (2015.11)

(56) References Cited

U.S. PATENT DOCUMENTS

| | | | |
|---|---|---|---|
| 9,272,866 B2 * | 3/2016 | Ishizuka | H02P 6/16 |
| 9,670,017 B2 * | 6/2017 | Anan | B65H 5/06 |
| 9,735,714 B2 * | 8/2017 | Yamagishi | H02P 1/52 |
| 2002/0051026 A1 | 5/2002 | Shoji et al. | |

FOREIGN PATENT DOCUMENTS

| | | |
|---|---|---|
| JP | 2010057314 A | 3/2010 |
| JP | 2010233415 A | 10/2010 |
| JP | 2013099056 A | 5/2013 |

* cited by examiner

MOTOR DRIVING DEVICE, SHEET CONVEYING DEVICE, AND IMAGE FORMING APPARATUS

TECHNICAL FIELD

The present invention relates to a motor driving device for controlling a driving motor, a sheet conveying device including the motor driving device, and an image forming apparatus including the sheet conveying device.

BACKGROUND ART

Conventionally, an image forming apparatus such as a copier, a printer, a facsimile, or a multifunction peripheral includes a plurality of rollers for conveying a sheet member on which an image is to be formed. The rollers are driven by a driving motor. As the driving motor, a servo motor such as a DC brushless motor may be adopted. It is noted that there is known a configuration where a DC brushless motor is used as a driving motor that drives conveyance rollers for conveying a sheet from a sheet feed cassette (see PTL 1).

In general, in an image forming apparatus in which the servo motor is adopted as a driving source of the conveying rollers, a detector such as a rotary encoder for detecting the rotation speed or the like of the driving motor is provided. In addition, a motor driver is electrically connected to the servo motor, and a control device such as a CPU is electrically connected to the motor driver. The control device outputs a control signal indicating a commanded speed to the servo motor, to the motor driver. The motor driver generates a driving current by the PWM (Pulse Width Modulation) method based on the commanded speed indicated by the control signal and the real rotation speed indicated by the detection result of the detector, and supplies the generated driving current to the servo motor.

Meanwhile, as the control signal output from the control device to the motor driver, a pulse signal is used that includes a plurality of pulses whose pulse width corresponds to each commanded speed to the servo motor. In this case, the motor driver detects the commanded speed and the cycle of the pulse signal based on the rising edge or the falling edge of the pulse signal (hereinafter, the edges are referred to as pulse edges).

CITATION LIST

Patent Literature

[PTL 1] Japanese Laid-Open Patent Publication No. 2013-99056

SUMMARY OF THE INVENTION

Problems to be Solved by the Invention

In the above-described configuration, in order to stop the rotation of the servo motor, the control device stops outputting the pulse signal to the motor driver. However, even when the output of the pulse signal is stopped, and the motor driver becomes unable to detect the pulse edges, the motor driver may not determine that it has received a command to stop supplying the driving current to the servo motor. As a result, even if the control device stops outputting the pulse signal to the motor driver, it is not enough to stop, in a reliable manner, the supply of the driving current from the motor driver to the servo motor.

As a result, a conventional motor driver is configured to stop supplying the driving current to the servo motor when the pulse edges cannot be detected during a predetermined wait time. However, with this configuration, the motor driver continues to supply the driving current during the wait time. As a result, the timing of stopping the supply of the driving current delays from the timing at which the supply of the driving current should be stopped originally.

Such a problem would not occur in a configuration where the control device outputs, to the motor driver, a stop signal instructing to stop supply of the driving current, as a separate signal from the pulse signal. However, this requires an additional signal line for the stop signal. This means that signal lines, connection terminals and the like need to be installed additionally. In the case where the control device and the motor driver are composed of a printed circuit board, the number of wiring patterns in the circuit board increases, which causes the enlargement of the circuit board.

The present invention has been made in view of such conventional circumstances, and it is an object of the present invention to provide a motor driving device, a sheet conveying device and an image forming apparatus that prevent the circuit configuration from becoming complicated and enlarged, and stop the supply of the driving current to the driving motor, such as the servo motor, at the right timing.

Solution to the Problems

A motor driving device according to an aspect of the present invention includes a speed control portion, a pulse signal output portion, a determination processing portion, and an end processing portion. The speed control portion is configured to perform a deceleration control of decelerating a rotation speed of a driving motor from a predetermined target rotation speed to zero based on a first pulse signal for the deceleration control that includes a plurality of pulses whose pulse width corresponds to each commanded speed to the driving motor. The pulse signal output portion is configured to generate the first pulse signal and a second pulse signal and output the second pulse signal to the speed control portion after outputting the first pulse signal to the speed control portion, wherein the pulse width of the first pulse signal changes by obeying a predetermined rule that corresponds to a deceleration tendency of the rotation speed during the deceleration control, and the second pulse signal does not obey the predetermined rule. The determination processing portion is configured to determine whether or not the second pulse signal is included in an input signal that is input from the pulse signal output portion to the speed control portion. The end processing portion is configured to, when the determination processing portion determines that the second pulse signal is included in the input signal, end the deceleration control by the speed control portion.

A sheet conveying device according to another aspect of the present invention includes the motor driving device and a conveyance roller. The conveyance roller is rotated by a driving force that is transmitted from the driving motor controlled by the motor driving device, and thereby conveys a sheet member.

An image forming apparatus according to a further aspect of the present invention includes the sheet conveying device and an image forming portion. The image forming portion forms an image on the sheet member conveyed by the sheet conveying device.

Advantageous Effects of the Invention

According to the present invention, it is possible to provide a motor driving device, a sheet conveying device and an image forming apparatus that prevent the circuit configuration from becoming complicated and enlarged, and stop the supply of the driving current to the driving motor, at the right timing.

DESCRIPTION OF EMBODIMENTS

The following describes embodiments of the present invention with reference to the drawings. It should be noted that the embodiments described in the following are examples of specific embodiments of the present invention and should not limit the technical scope of the present invention.

First Embodiment

Figure 1:
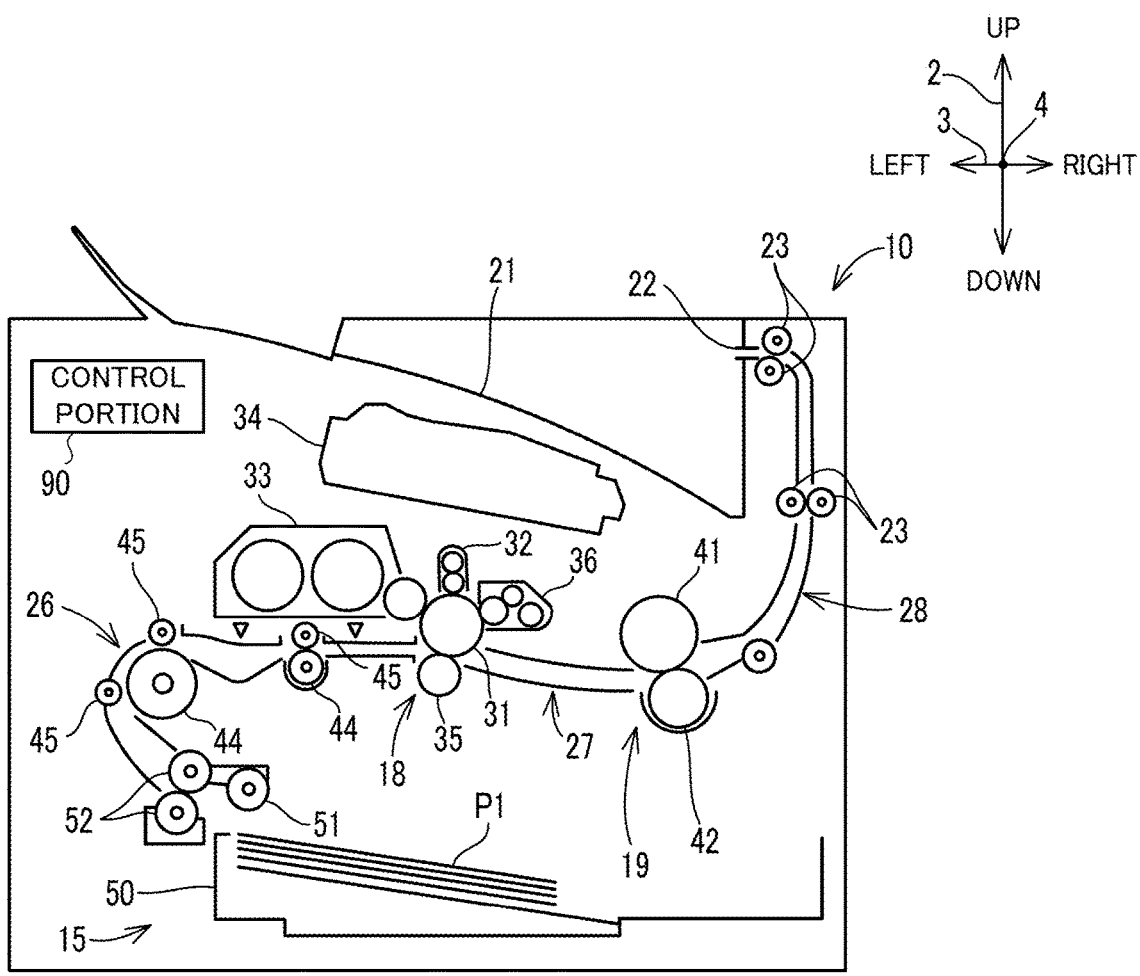
FIG. 1 is a diagram showing a configuration of an image forming apparatus according to a first embodiment of the present invention.

FIG. 1 is a diagram showing a configuration of an image forming apparatus 10 according to a first embodiment of the present invention. It is noted that in the following description, an up-down direction 2, a left-right direction 3, and a front-rear direction 4 shown in FIG. 1 may be used.

As shown in FIG. 1, the image forming apparatus 10 is a printer configured to print an image on a sheet member P1 by using toner. It is noted that the image forming apparatus 10 is not limited to a printer that has only a print function. For example, the present invention is applicable to a facsimile, a copier, or a multifunction peripheral having a plurality of functions such as a print function, a copying function, and a facsimile function.

The image forming apparatus 10 prints an image on a sheet member P1 based on image data input from outside via a network communication portion (not illustrated). The image forming apparatus 10 includes a sheet feed portion 15, an image forming unit 18, a fixing portion 19, a sheet discharge portion 21, a control portion 90, and a sheet conveying device 100 (see FIG. 2).

The sheet feed portion 15 includes a sheet feed tray 50, a pick-up roller 51 and a pair of sheet-feed rollers 52. The sheet feed tray 50 stores sheet members P1 on which images are to be formed by the image forming unit 18. When an instruction to start feeding of a sheet member P1 is input to the image forming apparatus 10, a sheet member P1 is fed from the sheet feed tray 50 by the pick-up roller 51 and the pair of sheet-feed rollers 52. The sheet member P1 fed by the pick-up roller 51 is conveyed by the pair of sheet-feed rollers 52 to a first conveyance path 26 formed on the downstream side in a feeding direction of the sheet member P1.

The first conveyance path 26 extends from the pair of sheet-feed rollers 52 to the image forming unit 18, and is formed by conveyance guides (not illustrated) that are disposed to face each other. A plurality of rotation rollers 44 are disposed in the first conveyance path 26. At each of the rotation rollers 44, a rotatable roll 45 is disposed in a state of being in contact with the circumferential surface of the rotation roller 44, and as the rotation roller 44 rotates, and each rotatable roll 45 rotates following the rotation of the corresponding rotation roller 44. The sheet member P1, having been fed into the first conveyance path 26 by the pair of sheet-feed rollers 52, is conveyed to the image forming unit 18 while being nipped by the rotation rollers 44 and the corresponding rotatable rolls 45.

The image forming unit 18 is provided in the vicinity of an end of the first conveyance path 26. The image forming unit 18 is an electrophotographic image forming unit configured to form a toner image on the sheet member P1 based on image data input from outside. The image forming unit 18 includes a photoconductor drum 31, a charging portion 32, a developing portion 33, an exposure portion 34, a transfer portion 35, and a cleaning portion 36.

When an image forming operation is started, the charging portion 32 charges the surface of the photoconductor drum 31 uniformly into a certain potential. In addition, the exposure portion 34 scans the charged photoconductor drum 31 with a laser beam based on the image data. With this operation, an electrostatic latent image is formed on the photoconductor drum 31. Thereafter, the developing portion 33 causes the toner to adhere to the electrostatic latent image, so that a toner image is developed on the photoconductor drum 31. The toner image is transferred by the transfer portion 35 to the sheet member P1 that has been conveyed in the first conveyance path 26. The sheet member P1 to which the toner image has been transferred is conveyed to a second conveyance path 27 that is formed more on the downstream side in the conveyance direction of the sheet member P1 than the image forming unit 18.

The sheet member P1, having been fed into the second conveyance path 27 from the image forming unit 18, is conveyed in the second conveyance path 27 to the fixing portion 19. The fixing portion 19 fixes the toner image that has been transferred to the sheet member P1, to the sheet member P1 by heat and pressure. The fixing portion 19 includes a heating roller 41 and a pressure roller 42. In the fixing portion 19, toner is fused by heat of the heating roller 41, and is fixed to the sheet member P1. The sheet member P1 to which the image has been fixed by the fixing portion 19 is conveyed to a third conveyance path 28 that is formed more on the downstream side in the conveyance direction of the sheet member P1 than the fixing portion 19.

A plurality of pairs of discharge rollers 23 are provided in the third conveyance path 28. The sheet member P1 having been fed into the third conveyance path 28 is conveyed upward in the third conveyance path 28 by the pairs of discharge rollers 23, and is discharged from a sheet discharge port 22 to the sheet discharge portion 21 that is provided on an upper surface of the image forming apparatus 10.

As described above, the pick-up roller 51, the pair of sheet-feed rollers 52, the rotation rollers 44, the heating roller 41, the pressure roller 42, and the pairs of discharge rollers 23 convey the sheet member P1 by rotating. In the following description, these rollers are generally referred to as conveyance rollers 150 (see FIG. 2).

The control portion 90 is a microcomputer composed of, for example, a CPU, a ROM, and a RAM. The CPU is a processor that executes various calculation processes. The ROM is a nonvolatile storage portion in which various information such as control programs for causing the CPU to execute various processes are stored in advance. The RAM is a volatile storage portion and is used as a temporary storage memory (working area) for the various processes executed by the CPU. In the control portion 90, the CPU executes the programs stored in the ROM, and thereby comprehensively controls the operation of the image forming apparatus 10.

Figure 2:
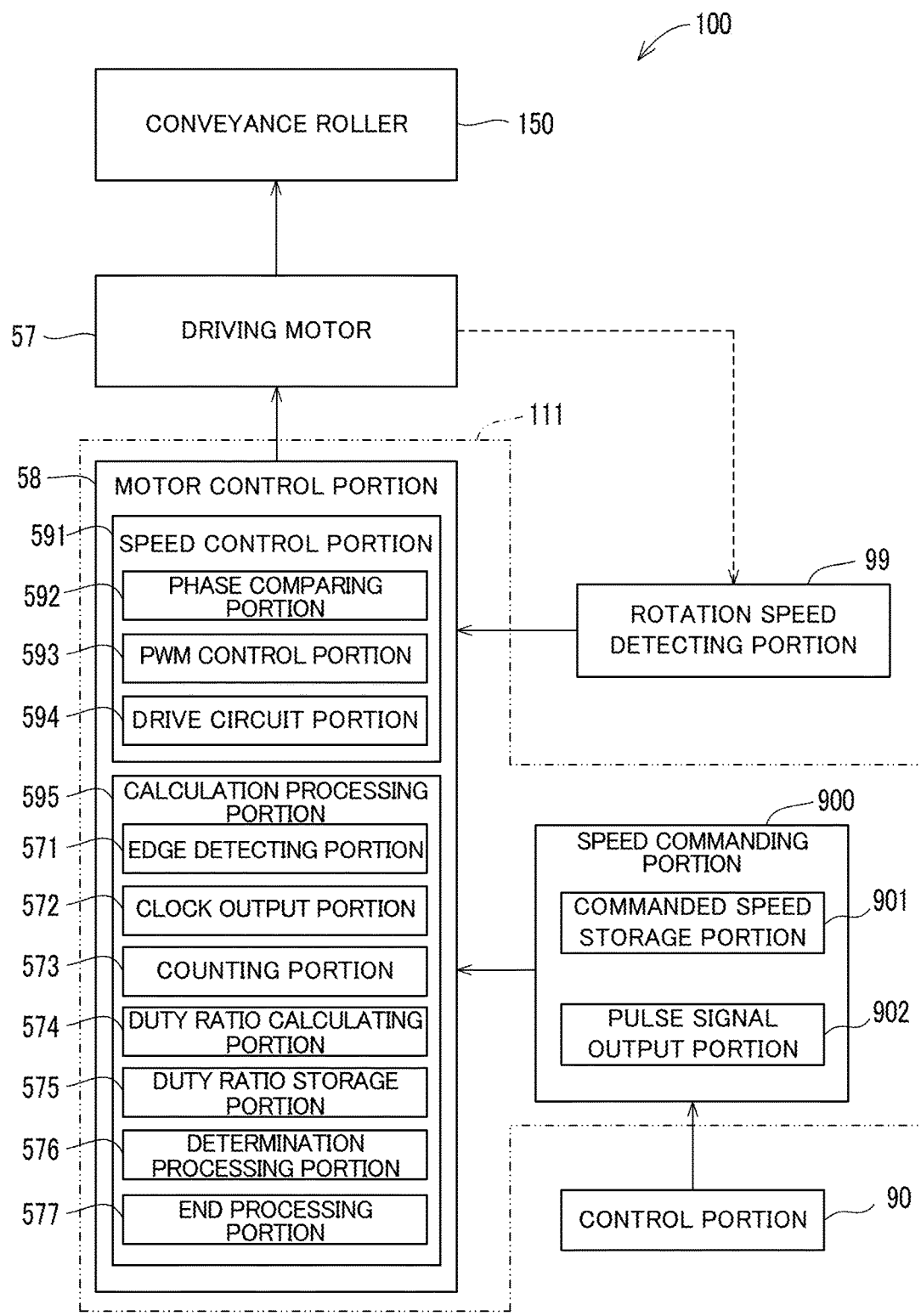
FIG. 2 is a block diagram showing a configuration of a sheet conveying device installed in the image forming apparatus according to the first embodiment of the present invention.

As shown in FIG. 2, the conveyance rollers 150 are rotationally driven upon receiving a driving force that is generated by a driving motor 57 and is transmitted via a drive transmission mechanism (not illustrated) such as a gear. The driving motor 57 is a servo motor such as a DC brushless motor. In the present embodiment, a DC brushless motor of an inner rotor type is adopted as the driving motor 57. In the DC brushless motor of the inner rotor type, a plurality of electromagnets are provided in a yoke, and a rotor coupled with a motor output shaft 48 (see FIG. 3) is provided inside the yoke. In addition, the rotor is rotated when a three-phase driving current of different phases is supplied to the electromagnets, and the conveyance rollers 150 are rotated via the motor output shaft 48 coupled with the rotor. It is noted that the driving motor 57 is not limited to the DC brushless motor as far as it is a servo motor in which the rotation speed and the like are controlled by a feedback control based on the speed signal that indicates the real rotation speed of the driving motor 57 that is detected by a rotation speed detecting portion 99 (see FIG. 3) described below.

The image forming apparatus 10 includes the rotation speed detecting portion 99 configured to detect a real rotation speed of the driving motor 57. In the present embodiment, the rotation speed detecting portion 99 is a rotary encoder.

Figure 3:
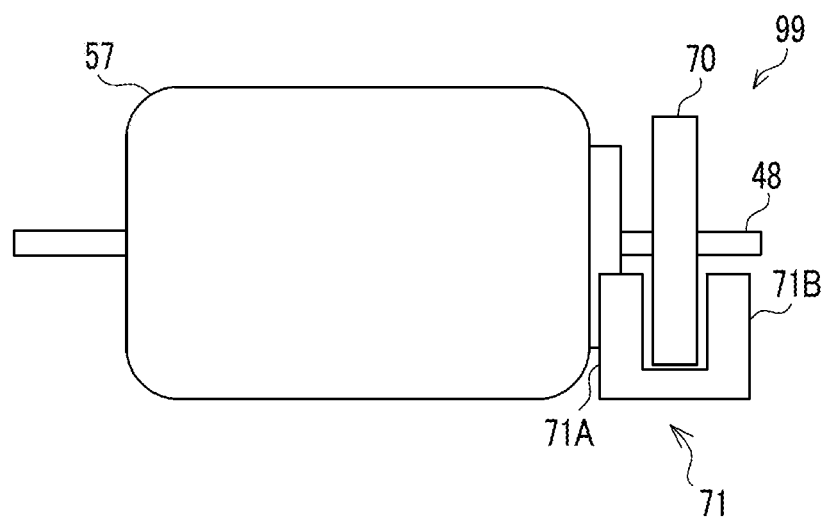
FIG. 3 is a diagram showing a configuration of a driving motor and a rotation speed detecting portion according to the first embodiment of the present invention.

As shown in FIG. 3, the rotation speed detecting portion 99 includes a pulse plate 70 of a disk shape, and a photointerruptor 71. In the pulse plate 70, a number of slits (not illustrated) extending radially are formed in alignment at intervals of a predetermined rotation angle in the circumferential direction. The pulse plate 70 is fixed to the motor output shaft 48 of the driving motor 57.

The photointerruptor 71 includes a light emitting portion 71A and a light receiving portion 71B that are disposed to face each other across a certain gap. The pulse plate 70 is placed at least partially in the gap between the light emitting portion 71A and the light receiving portion 71B. The signal level of a signal output from the light receiving portion 71B changes depending on whether the light output from the light emitting portion 71A passes through a slit and is received by the light receiving portion 71B, or the light is blocked by a portion of the pulse plate 70 other than the slits. As a result, as the pulse plate 70 rotates, pulse signals are output from the light receiving portion 71B. The pulse signals output from the light receiving portion 71B are output to a motor control portion 58 as the speed signals of the rotation speed detecting portion 99.

As shown in FIG. 2, the sheet conveying device 100 includes a driving motor 57, a motor driving device 111, and the conveyance rollers 150. The motor driving device 111 includes a speed commanding portion 900 and a motor control portion 58. The speed commanding portion 900 is communicably connected to the control portion 90, and receives, from the control portion 90, a command signal representing, for example, a command to start or end driving the driving motor 57. Upon receiving, from the control portion 90, a command signal representing a command to start driving the driving motor 57, the speed commanding portion 900 outputs, to the motor control portion 58, a driving pulse signal commanding a rotation speed of the driving motor 57, wherein the driving pulse signal is described below. The motor control portion 58 is communicably connected to the driving motor 57 and the speed commanding portion 900. Upon receiving the driving pulse signal from the speed commanding portion 900, the motor control portion 58 controls a driving current supplied to the driving motor 57. The conveyance rollers 150 are rotated by a driving force transmitted from the driving motor 57 under the control of the motor control portion 58, and thereby convey the sheet member P1.

In the present embodiment, the speed commanding portion 900 is composed of an electronic circuit such as an integrated circuit (ASIC), and an internal memory. However, the speed commanding portion 900 may be composed of a microcomputer having a CPU, as is the case with the control portion 90.

The motor control portion 58 includes a speed control portion 591. The speed control portion 591 is composed of an electronic circuit such as an integrated circuit (ASIC), and an internal memory.

The speed control portion 591 generates the driving current by the PWM method (Pulse Width Modulation method), and supplies the generated current to the driving motor 57. In addition, the speed control portion 591 performs a feedback control of the rotation speed of the driving motor 57 based on the driving pulse signal (described below) input from the speed commanding portion 900, and the speed signal output from the rotation speed detecting portion 99. Specifically, the speed control portion 591 increases or decreases the driving current supplied to the driving motor 57 so that the rotation speed indicated by the speed signal matches the rotation speed indicated by the driving pulse signal. The commanded speed is described below.

The speed control portion 591 includes a phase comparing portion 592, a PWM control portion 593, and a drive circuit portion 594.

The phase comparing portion 592 performs, for example, a well-known PID (Proportional-Integral-Derivative) control based on a phase difference between the driving pulse signal input from the speed commanding portion 900 and the speed signal input from the rotation speed detecting portion 99.

The PWM control portion 593 generates a PWM signal having a duty ratio that corresponds to the control amount obtained by the PID control performed by the phase comparing portion 592.

The drive circuit portion 594 applies, to the driving motor 57, a voltage that is proportional to the duty ratio of the PWM signal output from the PWM control portion 593, and supplies the driving current to the driving motor 57.

Figure 4:
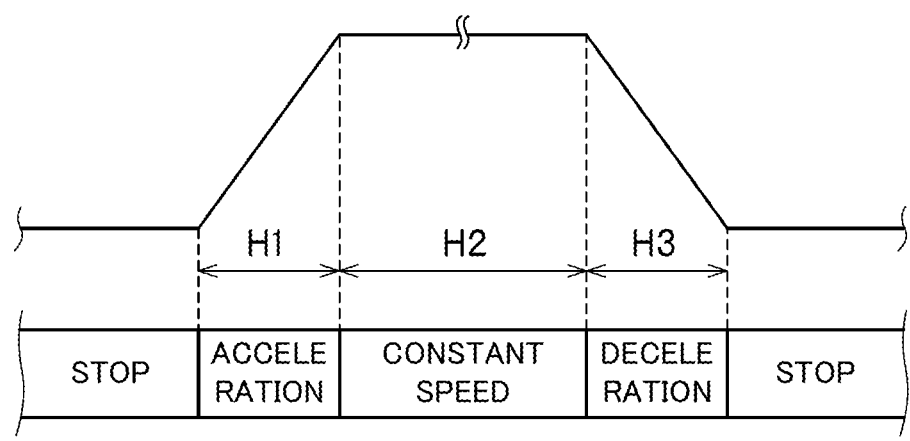
FIG. 4 is a graph showing a change of a commanded speed of a driving motor according to the first embodiment of the present invention.

As shown in FIG. 4, the rotation speed of the driving motor 57 is subjected to a so-called trapezoidal control performed by the motor control portion 58. That is, the period during which the rotation speed of the driving motor 57 is controlled includes an acceleration control period H1, a constant speed control period H2, and a deceleration control period H3. The acceleration control period H1 is followed by the constant speed control period H2, and the constant speed control period H2 is followed by the deceleration control period H3. In the acceleration control period H1, the rotation speed of the driving motor 57 is gradually increased from zero speed to a predetermined target rotation speed. This allows the conveyance rollers 150 to be accelerated to a rotation speed that corresponds to a predetermined conveyance speed at which the sheet member P1 is conveyed. During the constant speed control period H2 following the acceleration control period H1, the rotation speed of the driving motor 57 is maintained at the target rotation speed. This allows the conveyance rollers 150 to be maintained in the state of conveying the sheet member P1 at the conveyance speed. Thereafter, in the deceleration control period H3, the rotation speed of the driving motor 57 is gradually decreased from the target rotation speed to zero speed. This allows the conveyance rollers 150 to be decelerated from the conveyance speed, and stop.

For the motor control portion 58 to perform the control of the rotation speed of the driving motor 57, the rotation speed of the driving motor 57 is commanded from the speed commanding portion 900 to the motor control portion 58 during the periods H1 through H3.

Specifically, during the acceleration control period H1, the rotation speed of the driving motor 57 is commanded from the speed commanding portion 900 to the motor control portion 58 (speed control portion 591) for a plurality of times so that the rotation speed of the driving motor 57 gradually increases until it reaches the target rotation speed. That is, the commanded speed commanded from the speed commanding portion 900 to the motor control portion 58 increases stepwise. Hereinafter, the stepwise increase of the rotation speed is referred to as an acceleration tendency. During the constant speed control period H2, the rotation speed of the driving motor 57 is repeatedly commanded from the speed commanding portion 900 to the motor control portion 58 so that the motor control portion 58 causes the driving motor 57 to rotate at a constant rotation speed. During the deceleration control period H3, the rotation speed of the driving motor 57 is commanded from the speed commanding portion 900 to the motor control portion 58 for a plurality of times so that the rotation speed of the driving motor 57 gradually decreases from the target rotation speed until it reaches zero speed. That is, the commanded speed from the speed commanding portion 900 to the motor control portion 58 decreases stepwise. Hereinafter, the stepwise decrease of the rotation speed is referred to as a deceleration tendency.

The commanding of the rotation speed of the driving motor 57 from the speed commanding portion 900 to the motor control portion 58 (speed control portion 591) is carried out by the driving pulse signal that is output from a pulse signal output portion 902 to the motor control portion 58. The driving pulse signal includes an acceleration pulse signal SG1, a constant speed pulse signal SG2, and a deceleration pulse signal SG3 (see an upper part of FIG. 5), each of the signals SG1 to SG3 being a rectangular wave signal. A HIGH signal that is one rectangular wave, namely, a waveform portion from a rising edge E1 (see a middle part of FIG. 5) to a succeeding falling edge E2 (see the middle part of FIG. 5), is an example of the pulse of the present invention. Each of the acceleration pulse signal SG1, the constant speed pulse signal SG2, and the deceleration pulse signal SG3 includes a plurality of HIGH signals. The deceleration pulse signal SG3 corresponds to the first pulse signal of the present invention. It is noted that in the following description, the acceleration pulse signal SG1, the constant speed pulse signal SG2, and the deceleration pulse signal SG3 may be collectively referred to as driving pulse signals SG1 to SG3.

In the present embodiment, the duty ratio of the driving pulse signals SG1 to SG3 is a predetermined constant value regardless of the size of the commanded speed, and the commanded speed is commanded by the cycle of the driving pulse signals SG1 to SG3, namely, by the signal width of the HIGH signal. For example, as shown in the signal waveform of the upper part of FIG. 5, the acceleration pulse signal SG1 that is output from the pulse signal output portion 902 during the acceleration control period H1 in which the commanded speed increases stepwise, is a signal for accelerating the rotation speed of the driving motor 57, as described above. The cycle of the acceleration pulse signal SG1 and the signal width of the HIGH signal become shorter gradually. That is, the acceleration pulse signal SG1 in the acceleration control period H1 is a rectangular wave signal that includes a plurality of HIGH signals whose signal width becomes smaller gradually, from zero speed to the target rotation speed. The signal width of each HIGH signal of the acceleration pulse signal SG1 in the acceleration control period H1 indicates the commanded speed, namely, a rotation speed at which the driving motor 57 rotates after one cycle of the acceleration pulse signal SG1. It is noted that "one cycle" refers to a period from a rising edge of a HIGH signal to a rising edge of a succeeding HIGH signal. This applies to each instance of the term "cycle" described in the following. In the present embodiment, during the acceleration control period H1, the signal width becomes smaller gradually. This indicates that the rotation speed at which the driving motor 57 rotates after one cycle of the acceleration pulse signal SG1 is faster than the rotation speed indicated by the signal width of the HIGH signal immediately before. The signal width corresponds to the pulse width of the present invention.

The constant speed pulse signal SG2 that is output from the pulse signal output portion 902 during the constant speed control period H2 in which the commanded speed is constant, is a signal for maintaining the rotation speed of the driving motor 57 to the target rotation speed. The cycle of the constant speed pulse signal SG2 and the signal width of the HIGH signal do not change. That is, the constant speed pulse signal SG2 in the constant speed control period H2 is a rectangular wave signal composed of a plurality of HIGH signals that have the same signal width.

The deceleration pulse signal SG3 that is output from the pulse signal output portion 902 during the deceleration control period H3 in which the commanded speed decreases stepwise, is a signal for decelerating the rotation speed of the driving motor 57, as described above. The cycle of the deceleration pulse signal SG3 and the signal width of the HIGH signal become longer gradually. That is, the deceleration pulse signal SG3 in the deceleration control period H3 is a rectangular wave signal that includes a plurality of HIGH signals whose signal width becomes larger gradually, from the target rotation speed to zero speed. The signal width of each HIGH signal of the deceleration pulse signal SG3 in the deceleration control period H3 indicates the commanded speed, namely, a rotation speed at which the driving motor 57 rotates after one cycle of the deceleration pulse signal SG3. In the present embodiment, during the deceleration control period H3, the signal width becomes larger gradually. This indicates that the rotation speed at which the driving motor 57 rotates after one cycle of the deceleration pulse signal SG3 is slower than the rotation speed indicated by the signal width of the HIGH signal immediately before.

As described above, the signal width of the HIGH signal and the commanded speed correspond to each other. With regard to the acceleration pulse signal SG1 in the acceleration control period H1, as the commanded speed gradually increases, the signal width gradually decreases, and with regard to the deceleration pulse signal SG3 in the deceleration control period H3, as the commanded speed gradually decreases, the signal width gradually increases. That is, in response to the acceleration tendency of the rotation speed of the driving motor 57 during the acceleration control, the cycle of the acceleration pulse signal SG1 and the signal width gradually decrease. In addition, in response to the deceleration tendency of the rotation speed of the driving motor 57 during the deceleration control, the cycle of the deceleration pulse signal SG3 and the signal width gradually increase. Hereinafter, the gradual increase of the signal width is referred to as an increase tendency.

It is noted that in the present embodiment, the size of the absolute value of the acceleration in the deceleration control period H3 is the same as the size of the absolute value of the acceleration in the acceleration control period H1. As a result, in the deceleration control period H3, the pulse signal output portion 902 decreases the commanded speed from the target rotation speed to zero speed in the same period of time as when increasing the commanded speed from zero speed to the target rotation speed in the acceleration control period H1.

In this case, in the deceleration control period H3, the pulse signal output portion 902 outputs HIGH signals having the same signal widths as the HIGH signals of the acceleration pulse signal SG1 output in the acceleration control period H1, in the reversed order to the HIGH signals of the acceleration control period H1. As a result, with regard to the acceleration pulse signal SG1 in the acceleration control period H1, the signal width gradually decreases as the commanded speed gradually increases, and with regard to the deceleration pulse signal SG3 in the deceleration control period H3, the signal width gradually increases as the commanded speed gradually decreases. In this way, in response to the deceleration tendency of the rotation speed of the driving motor 57 during the deceleration control, the cycle of the deceleration pulse signal SG3 and the signal width have the increase tendency. In addition, the HIGH signal output last by the pulse signal output portion 902 in the deceleration control period H3 and the HIGH signal output first by the pulse signal output portion 902 in the acceleration control period H1 have the same signal width. It is noted that mentioning of two signal widths being the same is used not only for the case where the two signal widths completely match each other, but also for the case where the two signal widths are within a predetermined error range. In addition, the size of the absolute value of the acceleration in the deceleration control period H3 may be different from the size of the absolute value of the acceleration in the acceleration control period H1.

Meanwhile, in order to stop the rotation of the driving motor 57, the pulse signal output portion 902 of the speed commanding portion 900 stops outputting the deceleration pulse signal SG3 to the motor control portion 58. However, even when the output of the deceleration pulse signal SG3 is stopped, and the motor control portion 58 becomes unable to detect the pulse edges of the HIGH signals, the motor control portion 58 may not determine that it has received a command to stop supplying the driving current to the driving motor 57. As a result, even if the pulse signal output portion 902 stops outputting the deceleration pulse signal SG3 to the motor control portion 58, it is not enough to stop, in a reliable manner, the supply of the driving current from the motor control portion 58 to the driving motor 57.

As a result, a conventional motor control portion is configured to stop supplying the driving current to the driving motor 57 when the pulse edges cannot be detected during a predetermined wait time. However, with this configuration, the conventional motor control portion continues to supply the driving current during the wait time. As a result, the timing of stopping the supply of the driving current delays from the timing at which the supply of the driving current should be stopped originally.

Such a problem would not occur in a configuration where the pulse signal output portion 902 outputs, to the motor control portion 58, a stop signal instructing to stop supply of the driving current, as a separate signal from the deceleration pulse signal SG3. However, this requires an additional signal line for the stop signal. This means that signal lines, connection terminals and the like need to be installed additionally. In the case where the control device is composed of a printed circuit board, the number of wiring patterns in the circuit board increases, which causes the enlargement of the circuit board. On the other hand, according to the present embodiment, the configuration described in the following prevents the circuit configuration from becoming complicated and enlarged, and stops the supply of the driving current to the driving motor 57, at the right timing.

As shown in FIG. 2, the speed commanding portion 900 includes a commanded speed storage portion 901 and a pulse signal output portion 902. The commanded speed storage portion 901 stores commanded speed information of the driving motor 57 in the periods H1 to H3 in advance. Specifically, the commanded speed information is information of the signal width of the HIGH signals in the periods H1 to H3. The pulse signal output portion 902 generates and outputs driving pulse signals to the motor control portion 58 based on the commanded speed information stored in the commanded speed storage portion 901. This causes the speed control portion 591 of the motor control portion 58 to perform the acceleration control, the constant speed control, and the deceleration control.

Figure 5:
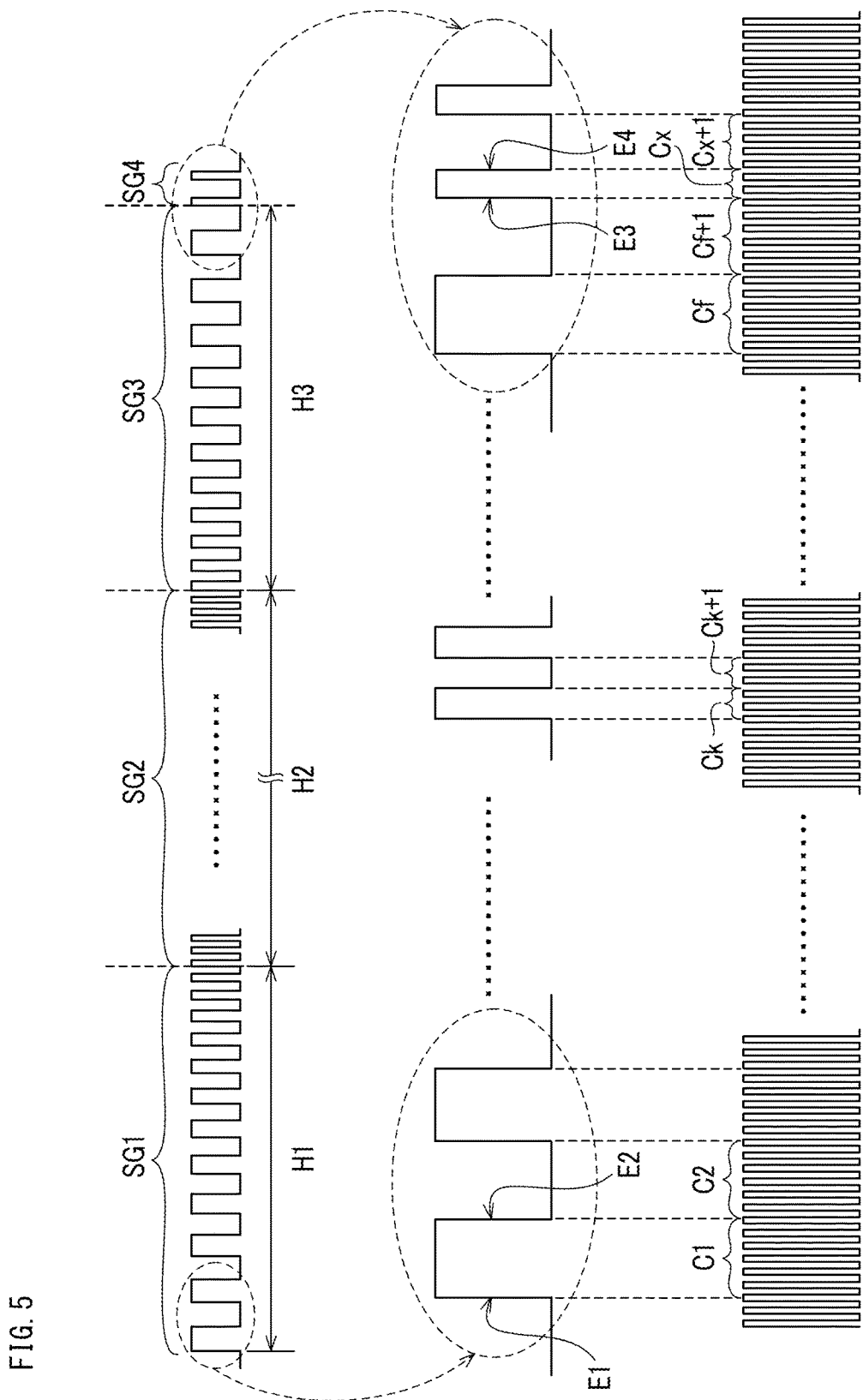
FIG. 5 is a diagram showing a signal waveform of a pulse signal output from a control portion according to the first embodiment of the present invention (upper part), a partially enlarged waveform of the signal waveform (middle part), and a signal waveform indicating a reference clock signal used to detect a pulse width of a HIGH signal included in the pulse signal (lower part).

In addition, as shown in FIG. 5, after completing outputting the deceleration pulse signal SG3 to the speed control portion 591, the pulse signal output portion 902 outputs a stop pulse signal SG4 that is described below, to the speed control portion 591 (motor control portion 58). As a result, the motor control portion 58 receives the stop pulse signal SG4 from the speed commanding portion 900 after the deceleration control period H3 ends. The stop pulse signal SG4 is also a rectangular wave signal.

The deceleration pulse signal SG3 has a predetermined rule that corresponds to the deceleration tendency of the rotation speed during the deceleration control. That is, the deceleration pulse signal SG3 in the deceleration control period H3 is a rectangular wave signal having a plurality of HIGH signals in which the duty ratio is constant, and the cycle of the deceleration pulse signal SG3 and the signal width of the HIGH signal become larger gradually, from the target rotation speed to zero speed. The predetermined rule is that the signal width gradually increases with time. On the other hand, the stop pulse signal SG4 does not obey the rule for the signal width. Specifically, the duty ratio of the stop pulse signal SG4 is smaller than that of the deceleration pulse signal SG3. In addition, the cycle of the stop pulse signal SG4 is shorter than that including the last HIGH signal of the deceleration pulse signal SG3 among the HIGH signals of the deceleration pulse signal SG3. As a result, the signal width of the HIGH signal of the stop pulse signal SG4 is smaller than the signal width of the last HIGH signal of the deceleration pulse signal SG3. In this way, the pulse signal output portion 902 outputs the stop pulse signal SG4 that is irregular with respect to the change of the deceleration pulse signal SG3 during the deceleration control, to the motor control portion 58 (speed control portion 591) as a signal instructing to stop controlling the rotation speed of the driving motor 57. The stop pulse signal SG4 is an example of the second pulse signal of the present invention. It is noted that it suffices that the stop pulse signal SG4 is a signal including at least two HIGH signals.

As shown in FIG. 2, the motor control portion 58 includes a calculation processing portion 595. The calculation processing portion 595 is composed of a microcomputer and a circuit element, wherein the microcomputer includes a CPU as is the case with the control portion 90. The ROM of the calculation processing portion 595 stores processing programs for causing the CPU to execute various processes. The calculation processing portion 595 functions as an edge detecting portion 571, a counting portion 573, a duty ratio calculating portion 574, a determination processing portion 576, and an end processing portion 577 when it executes the processing program by using the CPU. In addition, in the calculation processing portion 595, a duty ratio storage portion 575 is included in the ROM. Furthermore, a clock output portion 572 is composed of the circuit element.

The edge detecting portion 571 detects rising edges E1 and E3 and falling edges E2 and E4 of the driving pulse signals SG1 to SG3 and the stop pulse signal SG4 output from the pulse signal output portion 902.

As indicated by the signal waveform shown in the lower part of FIG. 5, the clock output portion 572 outputs a reference clock signal whose cycle is shorter than the signal width of the HIGH signals of the deceleration pulse signal SG3 and the stop pulse signal SG4. The reference clock signal is a rectangular wave signal of a high frequency (for example, 10 MHz) that is generated by an oscillation circuit composed of a crystal oscillator (not illustrated) that is the circuit element. Hereinafter, a waveform portion of the reference clock signal from a rising edge to a succeeding falling edge, namely, a HIGH level signal is referred to as a clock pulse.

The counting portion 573 counts the number of clock pulses that are output from the clock output portion 572 during a period from a rising edge to a succeeding falling edge that is a period during which each HIGH signal of the driving pulse signals SG1 to SG3 and the stop pulse signal SG4 is output. The number of clock pulses included in the reference clock signal is the same as, for example, the number of rising edges of the clock pulses. As a result, the counting portion 573 counts the number of rising edges of the clock pulses as the number of clock pulses. The count value of the counting portion 573 is proportional to the signal width of the HIGH signals.

The counting portion 573 also counts the number of clock pulses that are output from the clock output portion 572 during a period from a falling edge to a succeeding rising edge that is a period during which each LOW signal of the driving pulse signals SG1 to SG3 and the stop pulse signal SG4 is output. The number of clock pulses included in the reference clock signal is the same as, for example, the number of rising edges of the clock pulses. As a result, the counting portion 573 counts the number of rising edges of the clock pulses as the number of clock pulses. The count value of the counting portion 573 is proportional to the signal width of the LOW signals. The counting portion 573 is an example of the measuring portion of the present invention.

The duty ratio calculating portion 574 calculates the duty ratio of the pulse signal input from the pulse signal output portion 902 based on the number of clock pulses counted by the counting portion 573 for each output period of the HIGH signals and LOW signals. That is, as described above, the count value of the counting portion 573 is proportional to the signal width of the HIGH signals and LOW signals. As a result, the ratio of the count value of the HIGH signal to the sum of the count value of the HIGH signal and the count value of the LOW signal is the duty ratio. Accordingly, the duty ratio calculating portion 574 calculates, as the duty ratio, the ratio of the count value of the HIGH signal to the sum of the count value of the HIGH signal and the count value of the LOW signal. The duty ratio calculating portion 574 performs the above-mentioned duty ratio calculation process each time the rising edge of the HIGH signal is detected by the edge detecting portion 571.

The determination processing portion 576 determines whether or not the pulse signal that was input from the pulse signal output portion 902 to the speed control portion 591 (motor control portion 58), is the stop pulse signal SG4. Specifically, the determination processing portion 576 performs a comparison process of comparing a duty ratio currently calculated, with a duty ratio calculated immediately before by the duty ratio calculating portion 574. That is, the determination processing portion 576 determines whether or not the currently calculated duty ratio is the same as the duty ratio calculated immediately before. In other words, the determination processing portion 576 determines whether or not a pulse signal corresponding to the currently calculated duty ratio is any of the driving pulse signals SG1 to SG3 that obey the signal rule or the stop pulse signal SG4 that does not obey the signal rule. It is noted that mentioning of two duty ratios being the same is used not only for the case where the two duty ratios completely match each other, but also for the case where the two duty ratios are within a predetermined error range.

Upon determining that the currently calculated duty ratio is the same as the duty ratio calculated immediately before, the determination processing portion 576 determines that the pulse signal corresponding to the currently calculated duty ratio is any of the driving pulse signals SG1 to SG3, but not the stop pulse signal SG4. The case where the currently calculated duty ratio is the same as the duty ratio calculated immediately before is the case where the pulse signal corresponding to the currently calculated duty ratio is a pulse signal that obeys the above-mentioned signal rule. In this case, for the next comparison process, the determination processing portion 576 stores the duty ratio calculated by the duty ratio calculating portion 574 into the duty ratio storage portion 575.

On the other hand, upon determining that the currently calculated duty ratio is different from the duty ratio calculated immediately before, the determination processing portion 576 determines that the pulse signal corresponding to the currently calculated duty ratio is the stop pulse signal SG4, and determines that the control of the rotation speed of the driving motor 57 was commanded to be stopped. The case where the currently calculated duty ratio is different from the duty ratio calculated immediately before is the case where the pulse signal corresponding to the currently calculated duty ratio is not any of the driving pulse signals SG1 to SG3 that obey the signal rule, but is the stop pulse signal SG4. In this case, the determination processing portion 576 determines that the speed commanding portion 900 has commanded that the PWM control portion 593 stop the PWM signal generating process.

As described above, the determination processing portion 576 determines whether or not the stop pulse signal SG4 is included in the pulse signals input from the pulse signal output portion 902 to the speed control portion 591 (motor control portion 58).

When the determination processing portion 576 determines that the pulse signal corresponding to the currently calculated duty ratio is the stop pulse signal SG4, the end processing portion 577 determines that the speed commanding portion 900 has commanded that the PWM control portion 593 stop the PWM signal generating process. Subsequently, the end processing portion 577 causes the PWM control portion 593 to stop the PWM signal generating process by, for example, outputting a stop signal for stopping the switching operation to the PWM control portion 593.

Figure 6:
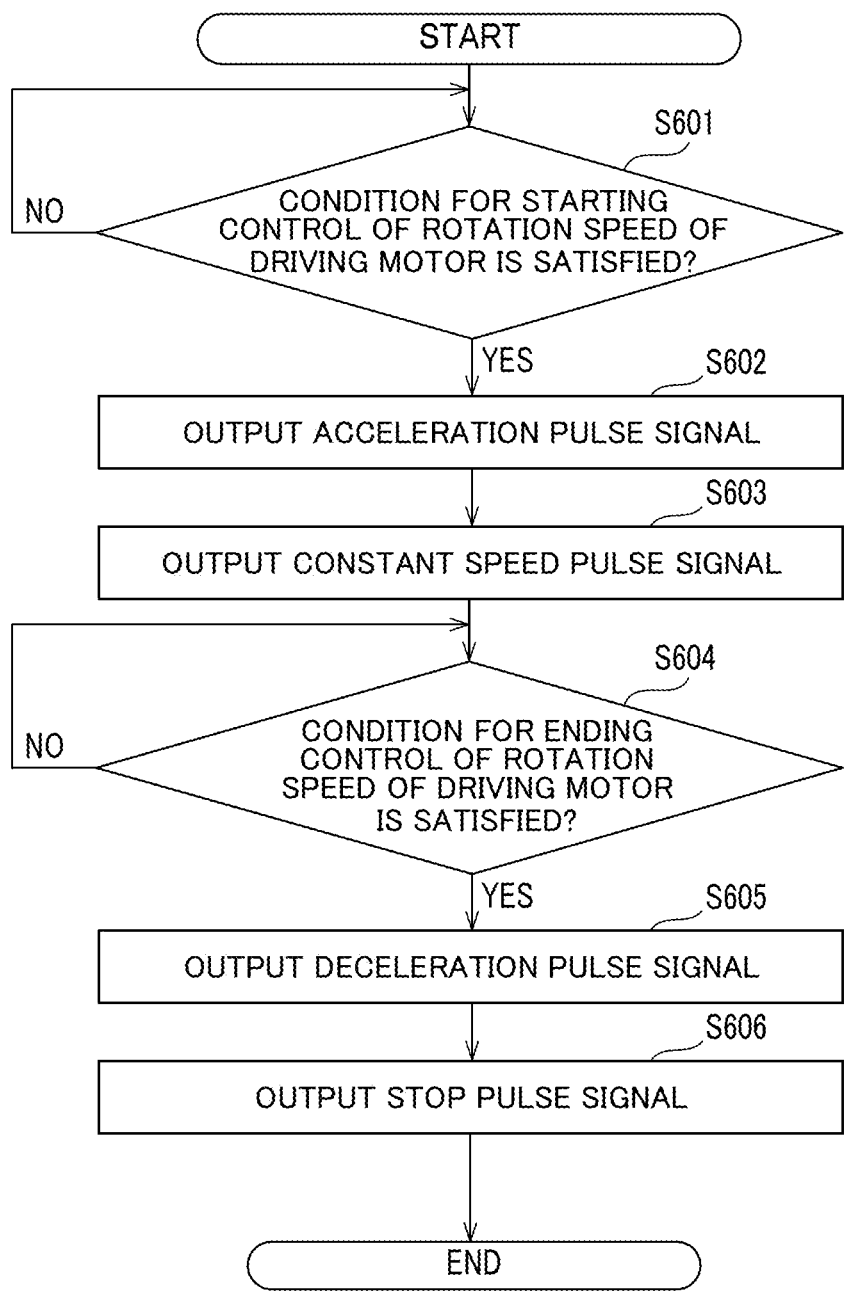
FIG. 6 is a flowchart of a speed commanding process performed by a speed commanding portion according to the first embodiment of the present invention.
Figure 7:
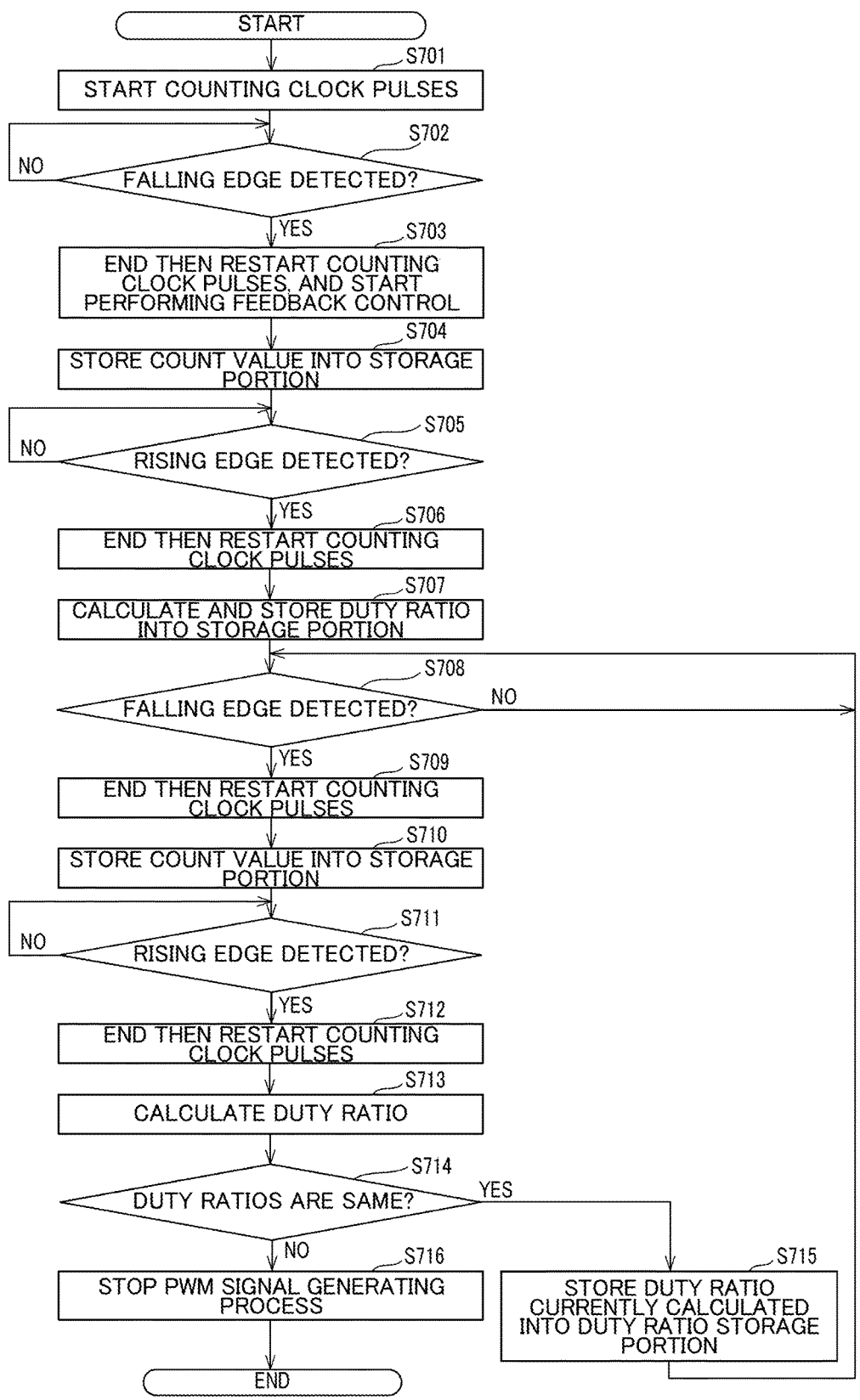
FIG. 7 is a flowchart showing a motor control process performed by a motor control portion according to the first embodiment of the present invention.

Next, a description is given of the motor driving process by the motor driving device 111 with reference to FIG. 6 and FIG. 7. FIG. 6 is a flowchart of a speed commanding process performed by the speed commanding portion 900. FIG. 7 is a flowchart of a motor control process performed by the motor control portion 58. The process shown in FIG. 7 is performed when the edge detecting portion 571 detects the rising edge E1 of the first HIGH signal while the driving motor 57 is in the halt state. It is noted that in the flowcharts of FIG. 6 and FIG. 7, steps S601, . . . , steps S701, . . . represent processing procedures (step numbers).

<Step S601>

As shown in FIG. 6, the pulse signal output portion 902 of the speed commanding portion 900 determines whether or not a start condition for starting the control of the rotation speed of the driving motor 57 is satisfied. As one example, the start condition is that an operation instructing a start of the image forming process has been performed on the image forming apparatus 10, and the control portion 90 has instructed to start controlling the conveyance rollers 150. Upon determining that the start condition is not satisfied (NO at step S601), the pulse signal output portion 902 executes the process of step S601 again. On the other hand, upon determining that the start condition is satisfied (YES at step S601), the pulse signal output portion 902 executes the process of step S602.

<Step S602>

The pulse signal output portion 902 generates the acceleration pulse signal SG1 based on the information of the commanded speed for the driving motor 57 commanded during the acceleration control period H1, and outputs the generated acceleration pulse signal SG1 to the speed control portion 591, the information being stored in the commanded speed storage portion 901 in advance.

<Step S603>

When the commanded speed reaches the target rotation speed, the pulse signal output portion 902 generates the constant speed pulse signal SG2 based on the information of the commanded speed for the driving motor 57 commanded during the constant speed control period H2, and outputs the generated constant speed pulse signal SG2 to the speed control portion 591, the information being stored in the commanded speed storage portion 901 in advance.

<Step S604>

The pulse signal output portion 902 determines whether or not an end condition for ending the control of the rotation speed of the driving motor 57 is satisfied. As one example, the end condition is that the image forming process of the image forming apparatus 10 has ended, and the control portion 90 has instructed to end controlling the conveyance rollers 150. Upon determining that the end condition is not satisfied (NO at step S604), the pulse signal output portion 902 executes the process of step S604 again. On the other hand, upon determining that the start condition is satisfied (YES at step S604), the pulse signal output portion 902 executes the process of step S605.

<Step S605>

The pulse signal output portion 902 generates the deceleration pulse signal SG3 based on the information of the commanded speed for the driving motor 57 commanded during the deceleration control period H3, and outputs the generated deceleration pulse signal SG3 to the speed control portion 591, the information being stored in the commanded speed storage portion 901 in advance.

<Step S606>

When the commanded speed reaches zero, the pulse signal output portion 902 outputs the stop pulse signal SG4 to the speed control portion 591.

<Step S701>

As shown in FIG. 7, when the edge detecting portion 571 of the calculation processing portion 595 of the motor control portion 58 detects the rising edge E1 of the first HIGH signal, the counting portion 573 of the calculation processing portion 595 starts counting the clock pulses included in the reference clock signal.

<Step S702>

The edge detecting portion 571 of the calculation processing portion 595 determines whether or not the falling edge E2 of the first HIGH signal was detected. Upon determining that the falling edge E2 of the first HIGH signal has not been detected (NO at step S702), the edge detecting portion 571 executes the process of step S702 again. On the other hand, upon determining that the falling edge E2 of the first HIGH signal was detected (YES at step S702), the edge detecting portion 571 executes the process of step S703.

<Step S703>
The counting portion 573 ends counting the clock pulses included in the reference clock signal, resets the count value, and then restarts the counting. In addition, the speed control portion 591 starts performing the feedback control of the rotation speed of the driving motor 57 based on the driving pulse signal input from the speed commanding portion 900 and the speed signal input from the rotation speed detecting portion 99.

<Step S704>
The duty ratio calculating portion 574 of the calculation processing portion 595 stores the count value of the counting portion 573 into the duty ratio storage portion 575.

<Step S705>
The edge detecting portion 571 determines whether or not the rising edge E1 of the HIGH signal succeeding the first HIGH signal was detected. Upon determining that the rising edge E1 of the HIGH signal has not been detected (NO at step S705), the edge detecting portion 571 executes the process of step S705 again. On the other hand, upon determining that the rising edge E1 of the HIGH signal was detected (YES at step S705), the calculation processing portion 595 executes the process of step S706.

<Step S706>
The counting portion 573 ends counting the clock pulses included in the reference clock signal, resets the count value, and then restarts the counting.

<Step S707>
The duty ratio calculating portion 574 calculates the duty ratio using the current count value of the counting portion 573 and the preceding count value stored in the duty ratio storage portion 575, and stores the calculated duty ratio in the duty ratio storage portion 575.

<Step S708>
The edge detecting portion 571 determines whether or not the falling edge E2 of the HIGH signal was detected. Upon determining that the falling edge E2 of the HIGH signal has not been detected (NO at step S708), the edge detecting portion 571 executes the process of step S708 again. On the other hand, upon determining that the falling edge E2 of the HIGH signal was detected (YES at step S708), the counting portion 573 executes the process of step S709.

<Step S709>
The counting portion 573 ends counting the clock pulses, resets the count value, and then restarts the counting.

<Step S710>
The duty ratio calculating portion 574 stores the count value of the counting portion 573 into the duty ratio storage portion 575.

<Step S711>
The edge detecting portion 571 determines whether or not the rising edge E1 of the HIGH signal was detected. Upon determining that the rising edge E1 of the HIGH signal has not been detected (NO at step S711), the edge detecting portion 571 executes the process of step S711 again. On the other hand, upon determining that the rising edge E1 of the HIGH signal was detected (YES at step S711), the edge detecting portion 571 executes the process of step S712.

<Step S712>
The counting portion 573 ends counting the clock pulses included in the reference clock signal, resets the count value, and then restarts the counting.

<Step S713>
The duty ratio calculating portion 574 calculates the duty ratio using the current count value of the counting portion 573 and the preceding count value stored in the duty ratio storage portion 575.

<Step S714>
The determination processing portion 576 of the calculation processing portion 595 compares a duty ratio currently calculated by the duty ratio calculating portion 574 with a preceding duty ratio stored in the duty ratio storage portion 575. Upon determining that the currently calculated duty ratio is the same as the preceding duty ratio (YES at step S714), the determination processing portion 576 determines that the pulse signal corresponding to the currently calculated duty ratio is any of the driving pulse signals SG1 to SG3. The calculation processing portion 595 then executes the process of step S715.

On the other hand, upon determining that the currently calculated duty ratio is smaller than the preceding duty ratio (NO at step S714), the determination processing portion 576 determines that the pulse signal corresponding to the currently calculated duty ratio is the stop pulse signal SG4. The calculation processing portion 595 then executes the process of step S716.

<Step S715>
The determination processing portion 576 stores the duty ratio currently calculated by the duty ratio calculating portion 574, into the duty ratio storage portion 575. The motor control portion 58 then executes the process of step S708.

<Step S716>
The end processing portion 577 determines that the speed commanding portion 900 has commanded to stop controlling the rotation speed of the driving motor 57, and causes the PWM control portion 593 to stop the PWM signal generating process.

As described above, the deceleration pulse signal SG3 has a signal rule that the duty ratio is constant, and the signal width has the increase tendency in response to the deceleration tendency of the rotation speed of the driving motor 57 during the deceleration control. When the output of the deceleration pulse signal SG3 is completed, the pulse signal output portion 902 outputs the stop pulse signal SG4 that is irregular with respect to the signal rule, to the speed control portion 591 of the motor control portion 58. The motor control portion 58 determines whether or not the received pulse signal obeys the signal rule. Upon determining that the received pulse signal does not obey the signal rule, namely, is the stop pulse signal SG4, the motor control portion 58 causes the PWM control portion 593 to stop the PWM signal generating process. As a result, with this configuration, the timing of the PWM control portion 593 stopping the PWM signal generating process is not delayed.

In addition, different from a configuration where the speed commanding portion 900 outputs, to the motor control portion 58, a stop signal instructing to stop supply of the driving current, as a separate signal from the pulse signal, the configuration of the present embodiment does not require an additional signal line for the stop signal, nor does it require additional installment of signal lines, connection terminals and the like.

As a result, the present embodiment realizes stopping, at the right timing, of the supply of the driving current to the driving motor 57, without the circuit configuration becoming complicated and enlarged.

Second Embodiment

In the following, the second embodiment of the present invention is described. It is noted that the configurations and processes that are common to the first embodiment are assigned the same reference signs, and description thereof is omitted. Thus configurations and processes different from those of the first embodiment are described in the following. Specifically, among the configurations and processes of the present embodiment, the main configuration of the image forming apparatus 10 (see FIG. 1), the configuration of the driving motor 57 and the rotation speed detecting portion 99 (see FIG. 3), the change of the commanded speed of the driving motor 57 (see the graph of FIG. 4), and the speed commanding process performed by the speed commanding portion 900 (see the flowchart of FIG. 6) are common to the first embodiment, and description thereof is omitted. In addition, the present embodiment differs from the first embodiment in that in the sheet conveying device 100, the calculation processing portion 595 of the motor control portion 58 does not include the duty ratio calculating portion 574 and the duty ratio storage portion 575, but includes a count value storage portion 575A. The other configurations of the sheet conveying device 100 are common to the first embodiment. As a result, with regard to the sheet conveying device 100 of the present embodiment, too, description of the configurations common to the first embodiment is omitted, and different configurations are described.

Figure 8:
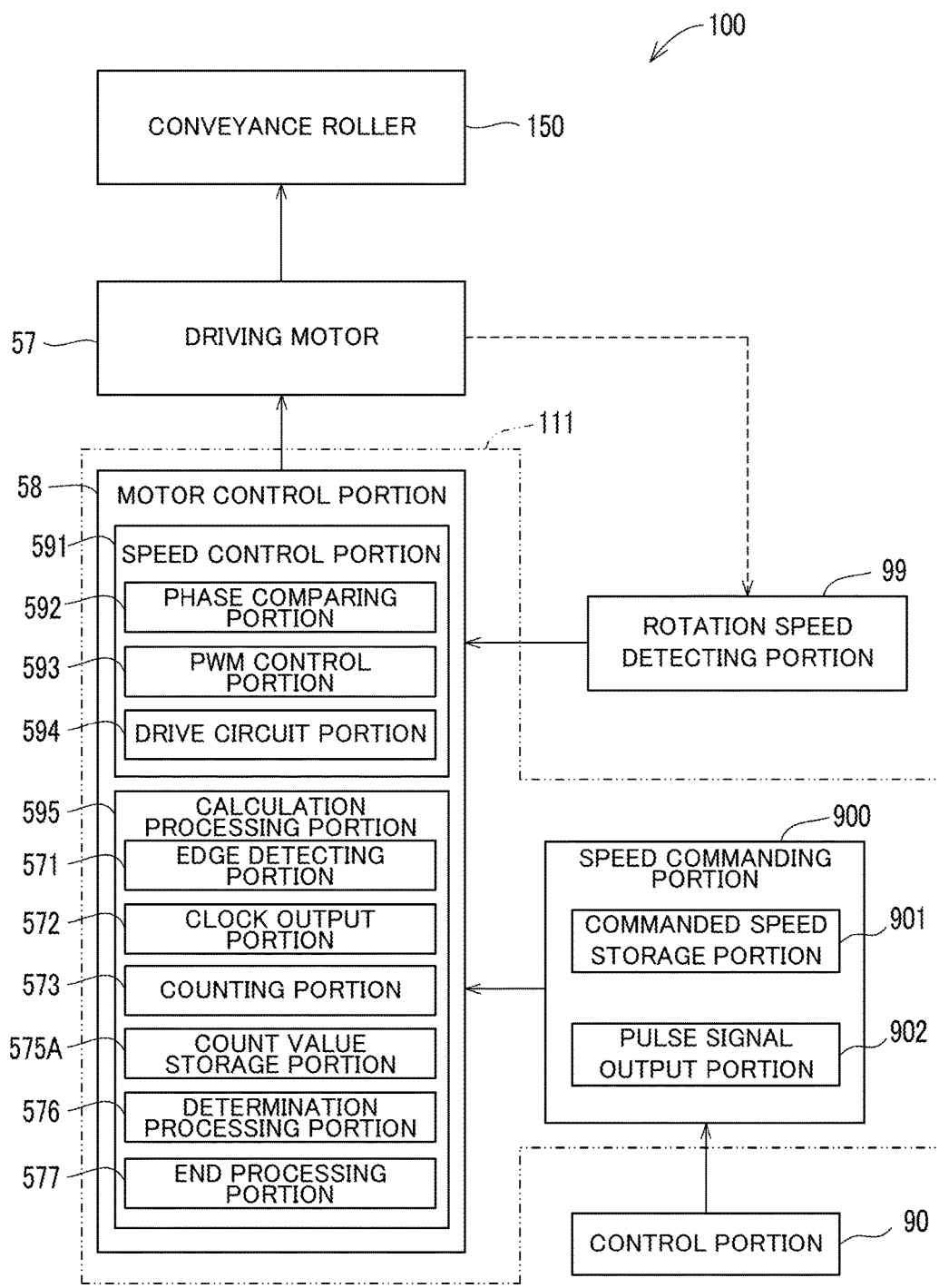
FIG. 8 is a block diagram showing a configuration of a sheet conveying device installed in an image forming apparatus according to a second embodiment of the present invention.

As shown in FIG. 8, the sheet conveying device 100 of the present embodiment includes the driving motor 57, the motor driving device 111, and the conveyance rollers 150. The motor driving device 111 includes the speed commanding portion 900 and the motor control portion 58.

The speed commanding portion 900 includes the commanded speed storage portion 901 and the pulse signal output portion 902. Upon receiving, from the control portion 90, a command signal representing a command to start driving the driving motor 57, the speed commanding portion 900 outputs, to the motor control portion 58, a driving pulse signal commanding a rotation speed of the driving motor 57.

The motor control portion 58 is communicably connected to the driving motor 57 and the speed commanding portion 900. Upon receiving the driving pulse signal from the speed commanding portion 900, the motor control portion 58 controls a driving current supplied to the driving motor 57. The conveyance rollers 150 are rotated by a driving force transmitted from the driving motor 57 under the control of the motor control portion 58, and thereby convey the sheet member P1.

The motor control portion 58 includes the speed control portion 591 and the calculation processing portion 595. The speed control portion 591 includes the phase comparing portion 592, the PWM control portion 593, and the drive circuit portion 594.

The commanding of the rotation speed of the driving motor 57 from the speed commanding portion 900 to the motor control portion 58 (speed control portion 591) is carried out by the driving pulse signal output from the pulse signal output portion 902 to the motor control portion 58. The driving pulse signal includes the acceleration pulse signal SG1, the constant speed pulse signal SG2, and the deceleration pulse signal SG3 (see an upper part of FIG. 9), each of the signals SG1 to SG3 being a rectangular wave signal. A HIGH signal that is one rectangular wave, namely, a waveform portion from a rising edge E1 (see a middle part of FIG. 9) to a succeeding falling edge E2 (see the middle part of FIG. 9), is an example of the pulse of the present invention. Each of the acceleration pulse signal SG1, the constant speed pulse signal SG2, and the deceleration pulse signal SG3 includes a plurality of HIGH signals. The deceleration pulse signal SG3 corresponds to the first pulse signal of the present invention. It is noted that in the following description, the acceleration pulse signal SG1, the constant speed pulse signal SG2, and the deceleration pulse signal SG3 may be collectively referred to as driving pulse signals SG1 to SG3.

In the present embodiment, the duty ratio of the driving pulse signals SG1 to SG3 is a predetermined constant value regardless of the size of the commanded speed, and the commanded speed is commanded by the cycle of the driving pulse signals SG1 to SG3, namely, by the signal width of the HIGH signal. For example, as shown in the signal waveform of the upper part of FIG. 9, the acceleration pulse signal SG1 that is output from the pulse signal output portion 902 during the acceleration control period H1 in which the commanded speed increases stepwise, is a signal for accelerating the rotation speed of the driving motor 57. The cycle of the acceleration pulse signal SG1 and the signal width of the HIGH signal become shorter gradually. That is, the acceleration pulse signal SG1 in the acceleration control period H1 is a rectangular wave signal that includes a plurality of HIGH signals whose signal width becomes smaller gradually, from zero speed to the target rotation speed. The signal width of each HIGH signal of the acceleration pulse signal SG1 in the acceleration control period H1 indicates the commanded speed, namely, a rotation speed at which the driving motor 57 rotates after one cycle of the acceleration pulse signal SG1. It is noted that "one cycle" refers to a period from a rising edge of a HIGH signal to a rising edge of a succeeding HIGH signal. This applies to each instance of the term "cycle" described in the following. In the present embodiment, during the acceleration control period H1, the signal width becomes smaller gradually. This indicates that the rotation speed at which the driving motor 57 rotates after one cycle of the acceleration pulse signal SG1 is faster than the rotation speed indicated by the signal width of the HIGH signal immediately before. The signal width corresponds to the pulse width of the present invention.

It is noted that the driving pulse signals SG1 to SG3 (see FIG. 9) have already been described in the first embodiment, and thus description thereof is omitted in the present embodiment.

Figure 9:
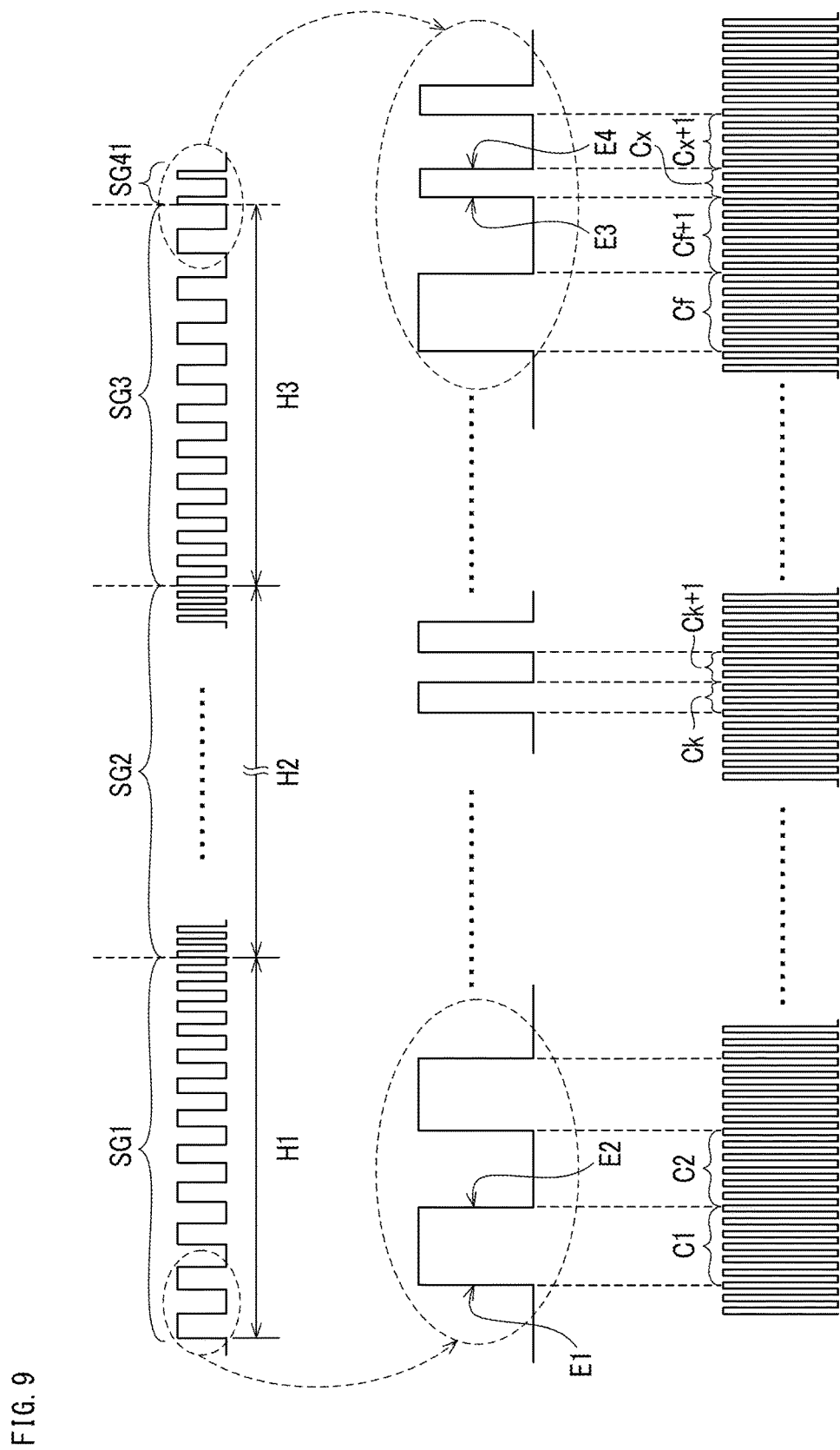
FIG. 9 is a diagram showing a signal waveform of a pulse signal output from a control portion according to the second embodiment of the present invention (upper part), a partially enlarged waveform of the signal waveform (middle part), and a signal waveform indicating a reference clock signal used to detect a pulse width of a HIGH signal included in the pulse signal (lower part).

In addition, as shown in FIG. 9, after completing outputting the deceleration pulse signal SG3 to the speed control portion 591, the pulse signal output portion 902 outputs a stop pulse signal SG41 that is described below, to the speed control portion 591 (motor control portion 58). As a result, the motor control portion 58 receives the stop pulse signal SG41 from the speed commanding portion 900 after the deceleration control period H3 ends. The stop pulse signal SG41 is also a rectangular wave signal.

The deceleration pulse signal SG3 has a predetermined rule that corresponds to the deceleration tendency of the rotation speed during the deceleration control. That is, the deceleration pulse signal SG3 in the deceleration control period H3 is a rectangular wave signal having a plurality of HIGH signals in which the duty ratio is constant, and the cycle of the deceleration pulse signal SG3 and the signal width of the HIGH signal become larger gradually, from the target rotation speed to zero speed. The predetermined rule is that the signal width gradually increases with time. On the other hand, the stop pulse signal SG41 does not obey the rule for the signal width. Specifically, the duty ratio of the stop pulse signal SG41 is the same as the duty ratio of the deceleration pulse signal SG3. In addition, the cycle of the stop pulse signal SG41 is shorter than that including the last HIGH signal of the deceleration pulse signal SG3 among the HIGH signals of the deceleration pulse signal SG3. As a result, the signal width of the HIGH signal of the stop pulse signal SG41 is smaller than the signal width of the last HIGH signal of the deceleration pulse signal SG3. In this way, the pulse signal output portion 902 outputs the stop pulse signal SG41 that is irregular with respect to the change of the deceleration pulse signal SG3 during the deceleration control, to the motor control portion 58 (speed control portion 591) as a signal instructing to stop controlling the rotation speed of the driving motor 57. The stop pulse signal SG41 is an example of the second pulse signal of the present invention.

As shown in FIG. 8, the motor control portion 58 includes the calculation processing portion 595. The calculation processing portion 595 is composed of a microcomputer and a circuit element, wherein the microcomputer includes a CPU as is the case with the control portion 90. The ROM of the calculation processing portion 595 stores processing programs for causing the CPU to execute various processes. The calculation processing portion 595 functions as the edge detecting portion 571, the counting portion 573, the determination processing portion 576, and the end processing portion 577 when it executes the processing program by using the CPU. In addition, in the calculation processing portion 595, a count value storage portion 575A is included in the ROM. Furthermore, the clock output portion 572 is composed of the circuit element.

The edge detecting portion 571 detects rising edges E1 and E3 and falling edges E2 and E4 of the driving pulse signals SG1 to SG3 and the stop pulse signal SG41 output from the pulse signal output portion 902.

As indicated by the signal waveform shown in the lower part of FIG. 9, the clock output portion 572 outputs a reference clock signal whose cycle is shorter than the signal width of the HIGH signals of the deceleration pulse signal SG3 and the stop pulse signal SG41. The reference clock signal is a rectangular wave signal of a high frequency (for example, 10 MHz) that is generated by an oscillation circuit composed of a crystal oscillator (not illustrated) that is the circuit element. Hereinafter, a waveform portion of the reference clock signal from a rising edge to a succeeding falling edge, namely, a HIGH level signal is referred to as a clock pulse.

The counting portion 573 counts the number of clock pulses that are output from the clock output portion 572 during a period from a rising edge E1, E3 to a succeeding falling edge E2, E4 that is a period during which each HIGH signal of the driving pulse signals SG1 to SG3 and the stop pulse signal SG41 is output. The number of clock pulses included in the reference clock signal is the same as, for example, the number of rising edges of the clock pulses. As a result, the counting portion 573 counts the number of rising edges of the clock pulses as the number of clock pulses. The count value of the counting portion 573 is proportional to the signal width of the HIGH signals.

When the deceleration control period H3 starts, the determination processing portion 576 determines whether or not the pulse signal that was input from the pulse signal output portion 902 to the speed control portion 591 (motor control portion 58), is the stop pulse signal SG41. Specifically, the determination processing portion 576 performs a comparison process of comparing a current count value of the counting portion 573 with a preceding count value. That is, the determination processing portion 576 determines whether or not the signal width of the current HIGH signal is larger or smaller than the signal width of the preceding HIGH signal, based on the current count value and the preceding count value. In other words, the determination processing portion 576 determines whether or not a pulse signal corresponding to the current count value is any of the driving pulse signals SG1 to SG3 or the stop pulse signal SG41.

Upon determining that the current count value is larger than the preceding count value, the determination processing portion 576 determines that the pulse signal corresponding to the current count value is the deceleration pulse signal SG3, not the stop pulse signal SG41. In this case, for the next comparison process, the determination processing portion 576 stores the current count value of the counting portion 573 into the count value storage portion 575A.

On the other hand, upon determining that the current count value is smaller than the preceding count value, the determination processing portion 576 determines that the pulse signal corresponding to the current count value is the stop pulse signal SG41.

As described above, the determination processing portion 576 determines whether or not the stop pulse signal SG41 is included in the pulse signals input from the pulse signal output portion 902 to the speed control portion 591 (motor control portion 58).

When the determination processing portion 576 determines that the pulse signal corresponding to the current count value is the stop pulse signal SG41, the end processing portion 577 determines that the speed commanding portion 900 has commanded to stop the PWM signal generating process of the PWM control portion 593, and stop controlling the rotation speed of the driving motor 57. Subsequently, the end processing portion 577 causes the PWM control portion 593 to stop the PWM signal generating process by, for example, outputting a stop signal for stopping the switching operation to the PWM control portion 593.

Figure 10:
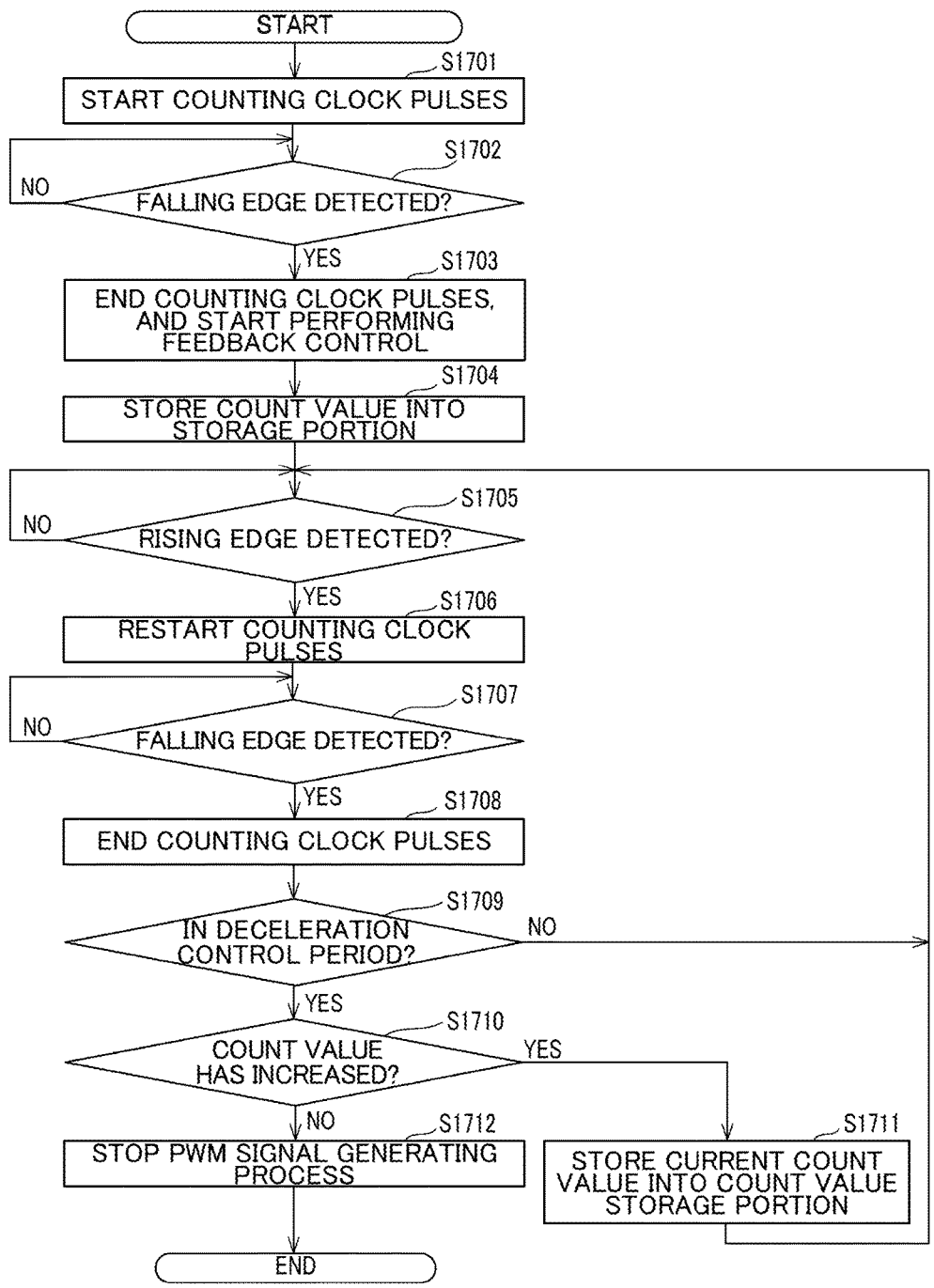
FIG. 10 is a flowchart of a motor control process performed by a motor control portion according to the second embodiment of the present invention.

Next, a description is given of the motor driving process by the motor driving device 111 with reference to FIG. 6 and FIG. 10. FIG. 6 is a flowchart of a speed commanding process performed by the speed commanding portion 900. FIG. 10 is a flowchart of a motor control process performed by the motor control portion 58. It is noted that in the flowcharts of FIG. 6 and FIG. 10, steps S601, . . . , steps S1701, . . . represent processing procedures (step numbers).

The speed commanding process is performed by the speed commanding portion 900 in accordance with the procedures of steps S601 to S606 in the flowchart shown in FIG. 6. It is noted that in step S606, when the commanded speed reaches zero, the pulse signal output portion 902 outputs the stop pulse signal SG41 to the speed control portion 591.

It is noted that since the speed commanding process (FIG. 6) has already been explained in the first embodiment, a description thereof is omitted in the present embodiment.

The motor control process shown in FIG. 10 is performed when the edge detecting portion 571 detects the rising edge E1 of the first HIGH signal while the driving motor 57 is in the halt state.

<Step S1701>

As shown in FIG. 10, when the edge detecting portion 571 of the calculation processing portion 595 of the motor control portion 58 detects the rising edge E1 of the first HIGH signal, the counting portion 573 of the calculation processing portion 595 starts counting the clock pulses.

<Step S1702>

The edge detecting portion 571 of the calculation processing portion 595 determines whether or not the falling edge E2 of the first HIGH signal was detected. Upon determining that the falling edge E2 of the first HIGH signal has not been detected (NO at step S1702), the edge detecting portion 571 executes the process of step S1702 again. On the other hand, upon determining that the falling edge E2 of the first HIGH signal was detected (YES at step S1702), the edge detecting portion 571 executes the process of step S1703.

<Step S1703>

The counting portion 573 ends counting the clock pulses included in the reference clock signal, and resets the count value. In addition, the speed control portion 591 starts performing the feedback control of the rotation speed of the driving motor 57 based on the driving pulse signal input from the speed commanding portion 900 and the speed signal input from the rotation speed detecting portion 99.

<Step S1704>

The counting portion 573 of the calculation processing portion 595 stores the count value into the count value storage portion 575A.

<Step S1705>

The edge detecting portion 571 determines whether or not the rising edge E1 of the next HIGH signal was detected. Upon determining that the rising edge E1 of the HIGH signal has not been detected (NO at step S1705), the edge detecting portion 571 executes the process of step S1705 again. On the other hand, upon determining that the rising edge E1 of the HIGH signal was detected (YES at step S1705), the calculation processing portion 595 executes the process of step S1706.

<Step S1706>

The counting portion 573 restarts counting the clock pulses included in the reference clock signal.

<Step S1707>

The edge detecting portion 571 of the calculation processing portion 595 determines whether or not the falling edge E2 of the next HIGH signal was detected. Upon determining that the falling edge E2 of the next HIGH signal has not been detected (NO at step S1707), the edge detecting portion 571 executes the process of step S1707 again. On the other hand, upon determining that the falling edge E2 of the next HIGH signal was detected (YES at step S1707), the edge detecting portion 571 executes the process of step S1708.

<Step S1708>

The counting portion 573 ends counting the clock pulses included in the reference clock signal, stores the count value into the count value storage portion 575A, and then resets the count value.

<Step S1709>

The determination processing portion 576 of the calculation processing portion 595 determines whether or not it is in the deceleration control period H3 by determining whether or not the pulse width that had been constant has increased from the preceding pulse width. When the determination processing portion 576 determines that the pulse width has not increased from the preceding pulse width and thus it is not in the deceleration control period H3 (NO at step S1709), the calculation processing portion 595 executes the process of step S1705. On the other hand, when the determination processing portion 576 determines that the pulse width has increased from the preceding pulse width and thus it is in the deceleration control period H3 (YES at step S1709), the calculation processing portion 595 executes the process of step S1710.

<Step S1710>

The determination processing portion 576 of the calculation processing portion 595 compares the current count value of the counting portion 573 with the preceding count value. Immediately after it is determined in step S1709 that it is in the deceleration control period H3, the determination processing portion 576 determines that the current count value has increased from the preceding count value, and thus the calculation processing portion 595 executes the process of the next step S1711.

<Step S1711>

In step S1711, the determination processing portion 576 stores the current count value of the counting portion 573 into the count value storage portion 575A. In addition, the calculation processing portion 595 repeatedly executes the processes of steps S1705 to S1709. It is noted that when the processes of steps S1705 to S1709 are repeatedly executed, the determination process of the deceleration control period in step S1709 may be omitted.

In step S1710 of the second round, the determination processing portion 576 compares the current count value of the counting portion 573 with the preceding count value. Upon determining that the current count value has increased from the preceding count value (YES at step S1710), the determination processing portion 576 determines that the pulse signal corresponding to the current count value is the deceleration pulse signal SG3, and the calculation processing portion 595 executes the process of step S1711.

On the other hand, upon determining that the current count value has decreased from the preceding count value (NO at step S1710), the determination processing portion 576 determines that the pulse signal corresponding to the current count value is the stop pulse signal SG41, and the calculation processing portion 595 executes the process of step S1712.

<Step S1712>

The end processing portion 577 determines that the speed commanding portion 900 has commanded to stop controlling the rotation speed of the driving motor 57, and causes the PWM control portion 593 to stop the PWM signal generating process.

As described above, in the deceleration pulse signal SG3, the duty ratio is constant, and the signal width has the increase tendency in response to the deceleration tendency of the rotation speed of the driving motor 57 during the deceleration control. When the output of the deceleration pulse signal SG3 is completed, the pulse signal output portion 902 outputs the stop pulse signal SG41 that is irregular with respect to the increase tendency of the signal width, to the speed control portion 591 of the motor control portion 58. The duty ratio of the stop pulse signal SG41 is the same as the duty ratio of the deceleration pulse signal SG3, and the cycle of the stop pulse signal SG41 is shorter than the cycle including the last HIGH signal among the HIGH signals of the deceleration pulse signal SG3. As a result, the stop pulse signal SG41 is a pulse signal including a HIGH signal of a signal width that is smaller than the signal width of the last HIGH signal of the deceleration pulse signal SG3. The motor control portion 58 determines whether or not the signal widths of the received pulse signal match the increase tendency. Upon determining that the signal widths of the received pulse signal do not match the increase tendency, namely, the received pulse signal is the stop pulse signal SG41 that includes a HIGH signal of a signal width that is smaller than the signal width of the last HIGH signal of the deceleration pulse signal SG3, the motor control portion 58 causes the PWM control portion 593 to stop the PWM signal generating process. As a result, with this configuration, the timing of the PWM control portion 593 stopping the PWM signal generating process is not delayed.

It is noted that in the present embodiment, one cycle of the pulse signal is defined to be from a rising edge to a succeeding rising edge, and the signal width of the HIGH signal in the stop pulse signal SG41 is set to be shorter than the signal width of the HIGH signal in the deceleration pulse signal SG3.

However, not limited to the above, one cycle of the pulse signal may be defined to extend from a falling edge to a succeeding falling edge, and the signal width of the LOW signal in the stop pulse signal SG41 may be set to be shorter than the signal width of the LOW signal in the deceleration pulse signal SG3.

Third Embodiment

In the following, the third embodiment of the present invention is described. It is noted that the configurations and processes that are common to the second embodiment are assigned the same reference signs, and description thereof is omitted. Accordingly, configurations and processes different from those of the second embodiment are described in the following. Specifically, among the configurations and processes of the present embodiment, the main configuration of the image forming apparatus 10 (see FIG. 1), the configuration of the sheet conveying device 100 (see FIG. 8), the configuration of the driving motor 57 and the rotation speed detecting portion 99 (see FIG. 3), the change of the commanded speed of the driving motor 57 (see the graph of FIG. 4), and the speed commanding process performed by the speed commanding portion 900 (see the flowchart of FIG. 6) are common to the second embodiment, and description thereof is omitted. In addition, the present embodiment differs from the second embodiment in that the pulse signal output portion 902 outputs a stop pulse signal SG42 to the speed control portion 591 (motor control portion 58), and a part of the procedures of the motor control process performed by the motor control portion 58 is different. In the following, only differences are described, and description of the configurations common to the second embodiment is omitted.

Figure 11:
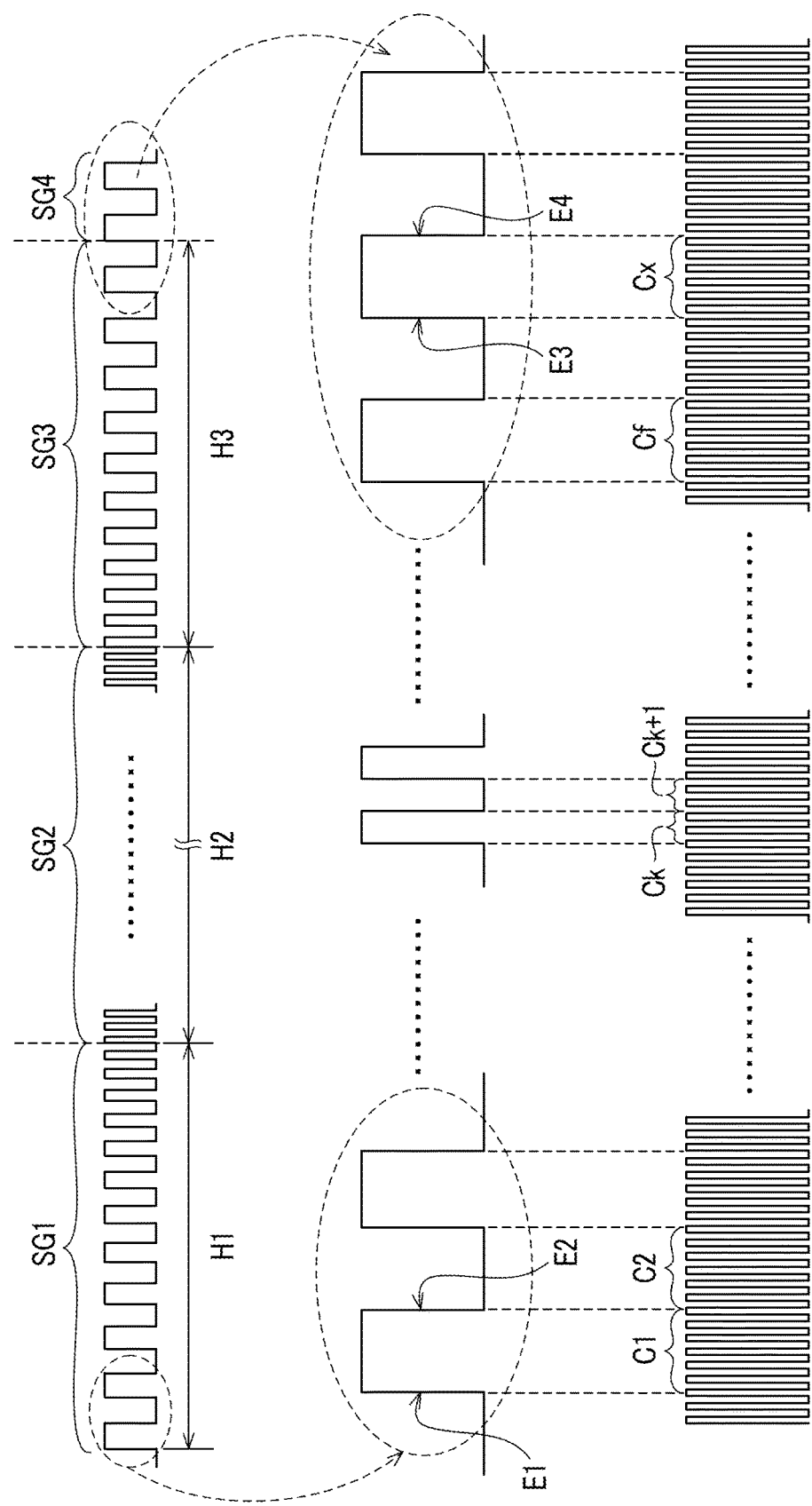
FIG. 11 is a diagram showing a signal waveform of a pulse signal output from a control portion according to a third embodiment of the present invention (upper part), a partially enlarged waveform of the signal waveform (middle part), and a signal waveform indicating a reference clock signal used to detect a pulse width of a HIGH signal included in the pulse signal (lower part).

As shown in FIG. 11, when the output of the deceleration pulse signal SG3 to the speed control portion 591 is completed, the pulse signal output portion 902 outputs a stop pulse signal SG42 that is described below, to the speed control portion 591 (motor control portion 58). This allows the motor control portion 58 to receive the stop pulse signal SG42 from the speed commanding portion 900 after the deceleration control period H3 ends. The stop pulse signal SG42 is also a rectangular wave signal.

The deceleration pulse signal SG3 has a predetermined rule that corresponds to the deceleration tendency of the rotation speed during the deceleration control. That is, the deceleration pulse signal SG3 in the deceleration control period H3 is a rectangular wave signal having a plurality of HIGH signals in which the duty ratio is constant, and the cycle of the deceleration pulse signal SG3 and the signal width of the HIGH signal become larger gradually, from the target rotation speed to zero speed. The predetermined rule is that the signal width gradually increases with time. On the other hand, the stop pulse signal SG42 does not obey the rule for the signal width. Specifically, the duty ratio of the stop pulse signal SG42 is the same as the duty ratio of the deceleration pulse signal SG3. In addition, the length of the cycle of the stop pulse signal SG42 is the same as the length of the cycle including the last HIGH signal among the HIGH signals of the deceleration pulse signal SG3. As a result, the signal width of the HIGH signal of the stop pulse signal SG42 is the same as the signal width of the last HIGH signal of the deceleration pulse signal SG3. In this way, the pulse signal output portion 902 outputs the stop pulse signal SG42 that is irregular with respect to the change of the deceleration pulse signal SG3 during the deceleration control, to the motor control portion 58 (speed control portion 591) as a signal instructing to stop controlling the rotation speed of the driving motor 57. The stop pulse signal SG42 is an example of the second pulse signal of the present invention.

It is noted that the edge detecting portion 571 of the calculation processing portion 595 detects rising edges E1 and E3 and falling edges E2 and E4 of the driving pulse signals SG1 to SG3 and the stop pulse signal SG42 output from the pulse signal output portion 902.

As indicated by the signal waveform shown in the lower part of FIG. 11, the clock output portion 572 outputs a reference clock signal whose cycle is shorter than the signal width of the HIGH signals of the deceleration pulse signal SG3 and the stop pulse signal SG42. The reference clock signal is a rectangular wave signal of a high frequency (for example, 10 MHz) that is generated by an oscillation circuit composed of a crystal oscillator (not illustrated) that is the circuit element. Hereinafter, a waveform portion of the reference clock signal from a rising edge to a succeeding falling edge, namely, a HIGH level signal is referred to as a clock pulse.

The counting portion 573 counts the number of clock pulses that are output from the clock output portion 572 during a period from a rising edge E1, E3 to a succeeding falling edge E2, E4 that is a period during which each HIGH signal of the driving pulse signals SG1 to SG3 and the stop pulse signal SG42 is output.

When the deceleration control period H3 starts, the determination processing portion 576 determines whether or not the pulse signal that was input from the pulse signal output portion 902 to the speed control portion 591 (motor control portion 58), is the stop pulse signal SG42. Specifically, the determination processing portion 576 performs a comparison process of comparing a current count value of the counting portion 573 with a preceding count value. That is, the determination processing portion 576 determines whether or not the signal width of the current HIGH signal is the same as the signal width of the preceding HIGH signal, based on the current count value and the preceding count value. In other words, the determination processing portion 576 determines whether or not a pulse signal corresponding to the current count value is any of the driving pulse signals SG1 to SG3 or the stop pulse signal SG42. It is noted that mentioning of two count values being the same is used not only for the case where the two count values completely match each other, but also for the case where the two count values are within a predetermined error range.

Upon determining that the current count value is not the same as the preceding count value, the determination processing portion 576 determines that the pulse signal corresponding to the current count value is the deceleration pulse signal SG3, not the stop pulse signal SG42. In this case, for the next comparison process, the determination processing portion 576 stores the current count value of the counting portion 573 into the count value storage portion 575A.

On the other hand, upon determining that the current count value is the same as the preceding count value, the determination processing portion 576 determines that the pulse signal corresponding to the current count value is the stop pulse signal SG42.

As described above, the determination processing portion 576 determines whether or not the stop pulse signal SG42 is included in the pulse signals input from the pulse signal output portion 902 to the speed control portion 591 (motor control portion 58).

When the determination processing portion 576 determines that the pulse signal corresponding to the current count value is the stop pulse signal SG42, the end processing portion 577 determines that the speed commanding portion 900 has commanded to stop the PWM signal generating process of the PWM control portion 593, and stop controlling the rotation speed of the driving motor 57. Subsequently, the end processing portion 577 causes the PWM control portion 593 to stop the PWM signal generating process by, for example, outputting a stop signal for stopping the switching operation to the PWM control portion 593.

Figure 12:
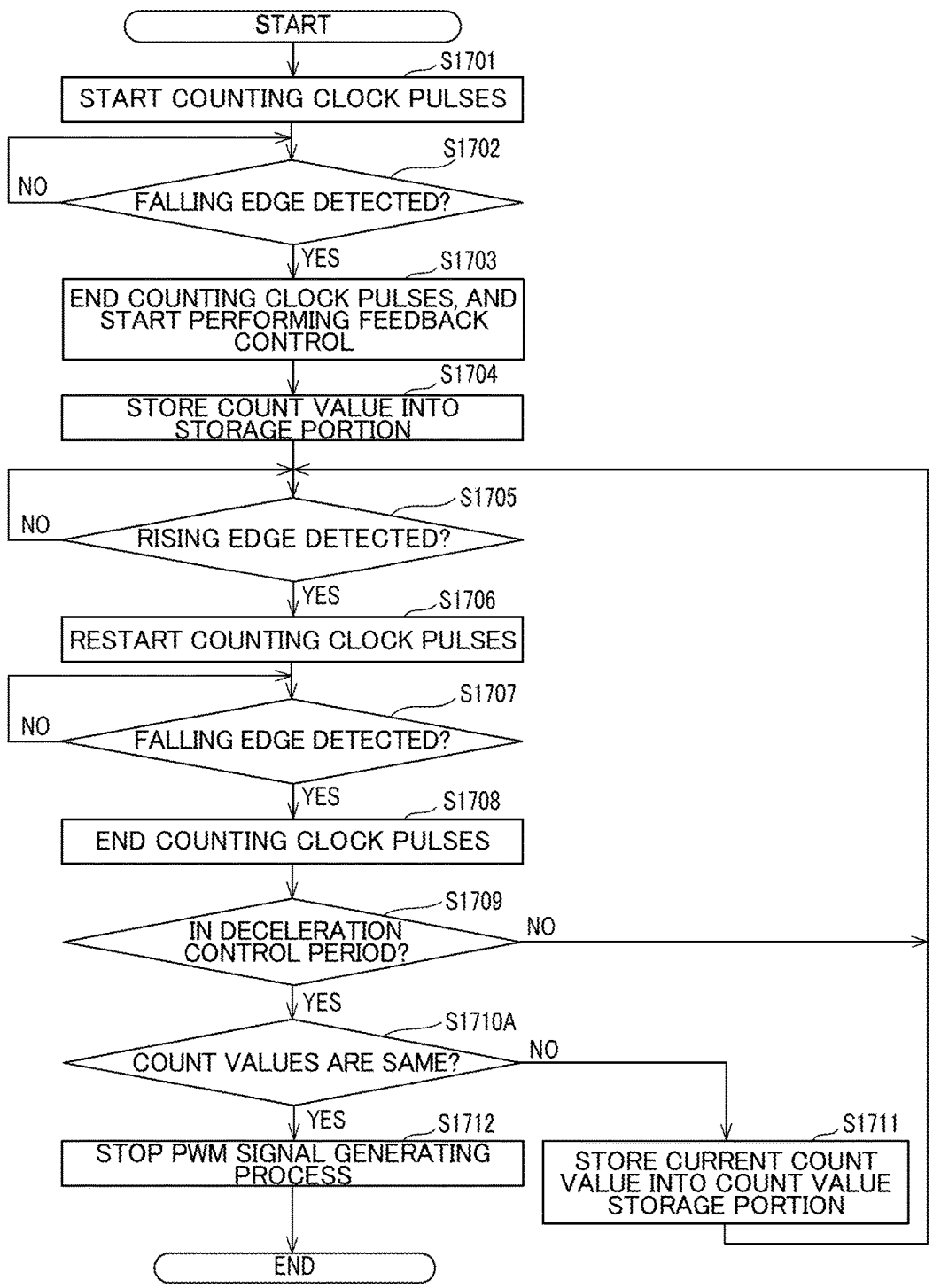
FIG. 12 is a flowchart of a motor control process performed by a motor control portion according to the third embodiment of the present invention.

Next, a description is given of the motor driving process by the motor driving device 111 with reference to FIG. 6 and FIG. 12. FIG. 6 is a flowchart of a speed commanding process performed by the speed commanding portion 900. FIG. 12 is a flowchart of a motor control process performed by the motor control portion 58. It is noted that in the flowcharts of FIG. 6 and FIG. 12, steps S601, . . . , steps S1701, . . . represent processing procedures (step numbers).

The speed commanding process is performed by the speed commanding portion 900 in accordance with the procedures of steps S601 to S606 in the flowchart shown in FIG. 6. It is noted that in step S606, when the commanded speed reaches zero, the pulse signal output portion 902 outputs the stop pulse signal SG42 to the speed control portion 591.

It is noted that since the speed commanding process (FIG. 6) has already been explained in the first embodiment and the second embodiment, a description thereof is omitted in the present embodiment.

The motor control process shown in FIG. 12 is performed when the edge detecting portion 571 detects the rising edge E1 of the first HIGH signal while the driving motor 57 is in the halt state. The motor control process is performed by the motor control portion 58 in accordance with the procedures of steps S1701 to S1712 shown in the flowchart of FIG. 12. With regard to the motor control process, the present embodiment differs from the second embodiment in that the determination process of step S1710A replaces the determination process of step S1710, but otherwise they are the same. As a result, the process of step S1710A is described in the following.

As shown in FIG. 12, when the edge detecting portion 571 detects the rising edge E1 of the first HIGH signal while the driving motor 57 is in the halt state, the motor control portion 58 performs the processing in accordance with the procedures of steps S1701 to S1709.

When the determination processing portion 576 determines in step S1709 that the pulse width has not increased from the preceding pulse width and thus it is not in the deceleration control period H3 (NO at step S1709), the calculation processing portion 595 executes the process of step S1705. On the other hand, when the determination processing portion 576 determines that the pulse width has increased from the preceding pulse width and thus it is in the deceleration control period H3 (YES at step S1709), the calculation processing portion 595 executes the process of step S1710A.

<Step S1710A>

The determination processing portion 576 of the calculation processing portion 595 compares the current count value of the counting portion 573 with the preceding count value. Immediately after it is determined in step S1709 that it is in the deceleration control period H3, the determination processing portion 576 determines that the current count value has increased from the preceding count value, and thus the calculation processing portion 595 executes the process of the next step S1711, and then repeatedly executes the processes of steps S1705 to S1709. In the second round of step S1710A, the determination processing portion 576 compares the current count value of the counting portion 573 with the preceding count value. Upon determining that the current count value is not the same as the preceding count value (NO at step S1710A), the determination processing portion 576 determines that the pulse signal corresponding to the current count value is the deceleration pulse signal SG3, and the calculation processing portion 595 executes the process of step S1711.

On the other hand, upon determining that the current count value is the same as the preceding count value (YES at step S1710A), the determination processing portion 576 determines that the pulse signal corresponding to the current count value is the stop pulse signal SG42, and the calculation processing portion 595 executes the process of step S1712.

As described above, in the deceleration pulse signal SG3, the duty ratio is constant, and the signal width has the increase tendency in response to the deceleration tendency of the rotation speed of the driving motor 57 during the deceleration control. When the output of the deceleration pulse signal SG3 is completed, the pulse signal output portion 902 outputs the stop pulse signal SG42 that is irregular with respect to the increase tendency of the signal width, to the speed control portion 591 of the motor control portion 58. The stop pulse signal SG42 includes a pulse whose pulse width is the same as that of the last pulse of the deceleration pulse signal SG3. The motor control portion 58 determines whether or not the signal widths of the received pulse signal match the increase tendency. Upon determining that the signal widths of the received pulse signal do not match the increase tendency, namely, the received pulse signal is the stop pulse signal SG42, the motor control portion 58 causes the PWM control portion 593 to stop the PWM signal generating process. As a result, with this configuration, the timing of the PWM control portion 593 stopping the PWM signal generating process is not delayed.

It is noted that in the above-described embodiments, the commanded speed storage portion 901 and the pulse signal output portion 902 of the speed commanding portion 900 are provided independently of the control portion 90. However, not limited to this, the speed commanding portion 900 may be provided in the control portion 90. In this case, the motor control portion 58 and the speed commanding portion 900 provided in the control portion 90 constitute an example of the motor driving device of the present invention.

In addition, in the above-described embodiments, the edge detecting portion 571, the clock output portion 572, and the counting portion 573 execute processing during the acceleration control period H1 and the constant speed control period H2. However, they may start executing processing after they enter the deceleration control period H3.

The invention claimed is:

1. A motor driving device comprising:
a speed control portion configured to perform a deceleration control of decelerating a rotation speed of a driving motor from a predetermined target rotation speed to zero based on a first pulse signal for the deceleration control that includes a plurality of pulses whose pulse width corresponds to each commanded speed to the driving motor;
a pulse signal output portion configured to generate the first pulse signal and a second pulse signal and output the second pulse signal to the speed control portion after outputting the first pulse signal to the speed control portion, the pulse width of the first pulse signal changing by obeying a predetermined rule that corresponds to a deceleration tendency of the rotation speed during the deceleration control, the second pulse signal not obeying the predetermined rule;
a determination processing portion configured to determine whether or not the second pulse signal is included in an input signal that is input from the pulse signal output portion to the speed control portion; and
an end processing portion configured to, when the determination processing portion determines that the second pulse signal is included in the input signal, end the deceleration control by the speed control portion.

2. The motor driving device according to claim 1, wherein the predetermined rule is that a duty ratio of the first pulse signal is constant, and the pulse width of the first pulse signal has an increase tendency in response to the deceleration tendency.

3. The motor driving device according to claim 2, further comprising:
a clock output portion configured to output a clock signal that is shorter in cycle than the first pulse signal;
a measuring portion configured to measure the pulse width and a width from a falling edge of a pulse to a rising edge of a succeeding pulse based on the number of clock signals output from the clock output portion; and
a duty ratio calculating portion configured to calculate a duty ratio of each pulse signal by using results of measurement of the measuring portion, wherein
the determination processing portion determines, as the second pulse signal, a signal whose duty ratio is different from the duty ratio of the first pulse signal, and determines that the second pulse signal is included in the input signal.

4. The motor driving device according to claim 1, wherein the speed control portion performs a feedback control of the rotation speed of the driving motor based on the first pulse signal and a speed signal that indicates a real rotation speed of the driving motor.

5. A sheet conveying device, comprising:
the motor driving device according to claim 1; and
a conveyance roller configured to be rotated by a driving force that is transmitted from the driving motor controlled by the motor driving device, and thereby convey a sheet member.

6. An image forming apparatus, comprising:
the sheet conveying device according to claim 5; and
an image forming portion configured to form an image on the sheet member conveyed by the sheet conveying device.

7. The motor driving device according to claim 1, wherein the predetermined rule is that a duty ratio of the first pulse signal is constant, and a cycle of the first pulse signal increases in response to the deceleration tendency, and
the second pulse signal has the same duty ratio as the first pulse signal and includes at least one pulse whose pulse width is smaller than a pulse width of a last pulse of the first pulse signal.

8. The motor driving device according to claim 7, wherein the speed control portion performs the feedback control of the rotation speed of the driving motor by using the first pulse signal and the speed signal that indicates the real rotation speed of the driving motor.

9. A sheet conveying device, comprising:
the motor driving device according to claim 7; and
a conveyance roller configured to be rotated by a driving force that is transmitted from the driving motor controlled by the motor driving device, and thereby convey a sheet member.

10. An image forming apparatus, comprising:
the sheet conveying device according to claim 9; and
an image forming portion configured to form an image on the sheet member conveyed by the sheet conveying device.

11. The motor driving device according to claim 1, wherein
the predetermined rule is that the pulse width of the first pulse signal increases in response to the deceleration tendency, and
the second pulse signal includes at least one pulse whose pulse width is the same as a pulse width of a last pulse of the first pulse signal.

12. The motor driving device according to claim 11, wherein
the speed control portion performs the feedback control of the rotation speed of the driving motor by using the first pulse signal and the speed signal that indicates the real rotation speed of the driving motor.

13. A sheet conveying device, comprising:
the motor driving device according to claim 11; and
a conveyance roller configured to be rotated by a driving force that is transmitted from the driving motor controlled by the motor driving device, and thereby convey a sheet member.

14. An image forming apparatus, comprising:
the sheet conveying device according to claim 13; and
an image forming portion configured to form an image on the sheet member conveyed by the sheet conveying device.

* * * * *